(12) United States Patent
Sakakibara

(10) Patent No.: US 6,577,104 B2
(45) Date of Patent: Jun. 10, 2003

(54) APPARATUS AND METHODS FOR DETERMINING APPROPRIATE TIMING FOR RECHARGING RECHARGEABLE BATTERIES

(75) Inventor: Kazuyuki Sakakibara, Anjo (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 10/123,508

(22) Filed: Apr. 15, 2002

(65) Prior Publication Data

US 2002/0149346 A1 Oct. 17, 2002

(30) Foreign Application Priority Data

Apr. 17, 2001 (JP) ........................................ 2001-117576

(51) Int. Cl.[7] .......................... H01M 10/44; H01M 10/46
(52) U.S. Cl. ........................................ 320/132; 320/135
(58) Field of Search ................................ 320/106, 110, 320/128, 132, 134, 136, 133, 155, 157, 158, 159, 135

(56) References Cited

U.S. PATENT DOCUMENTS 5,955,869 A * 9/1999 Rathmann
6,252,380 B1 * 6/2001 Koenck

FOREIGN PATENT DOCUMENTS

| JP | 7-143680 | 6/1985 | ............. H02J/7/02 |
|----|----------|--------|------------------------|
| JP | 4-32224 | 8/1992 | ........... B25B/21/00 |
| JP | 5-26278 | 4/1993 | ............. B25F/5/00 |
| JP | 7-001350 | 1/1995 | ........... B25B/21/00 |
| JP | 2001-238361 | 8/2001 | ............. H02J/7/04 |

* cited by examiner

*Primary Examiner*—Edward H. Tso
(74) *Attorney, Agent, or Firm*—Orrick, Herrington & Sutcliffe LLP

(57) ABSTRACT

When rechargeable batteries have been discharged to a selected voltage reference level, LED 29 (and/or buzzer BZ) and controller 32 may warn the operator that the rechargable batteries should be recharged. Controller 32 may change the selected reference voltage level based upon use history information concerning the rechargeable batteries. The use history information may, e.g., be stored in EEPROM 52 of battery pack 40. Thus, the rechargeable batteries can be discharged to different voltage levels before the operator is warned that the rechargeable batteries should be recharged. In addition or in the alternative, switch 36 may be disposed between the rechargeable batteries and a motor (M). Controller 32 may open switch 36 when the detected voltage of the rechargeable batteries drops below the selected reference voltage level (or a derivative of the selected reference voltage level) in order to interrupt the flow of current to the motor (M). Thus, the rechargeable batteries can be prevented from being over-discharged and from developing memory effects, thereby prolonging the usable life of the rechargeable batteries.

21 Claims, 15 Drawing Sheets

APPARATUS AND METHODS FOR DETERMINING APPROPRIATE TIMING FOR RECHARGING RECHARGEABLE BATTERIES

This application claims priority to Japanese patent application serial number 2001-117576, which was filed on Apr. 17, 2001.

The present invention generally relates to techniques for determining an appropriate timing, for stopping usage of rechargeable batteries before recharging. Such rechargeable batteries may preferably be utilized to drive power tools.

Some known battery-powered devices include means for warning the operator that the rechargeable batteries should be recharged. For example, when the amount of energy that the rechargeable batteries can further supply to the device (hereinafter referred to as "remaining battery capacity") has decreased to a certain level, the means warns the operator of the low remaining battery capacity. Other known battery-powered devices include means for shutting off the supply of current from the rechargeable battery when the battery voltage drops below a certain voltage level.

For example, Japanese Examined Utility Model Publication No. 4-32224 discloses a battery-powered device that actuates a display when the battery voltage has decreased below a reference voltage, thereby advising the operator to recharge the rechargeable batteries. Japanese Laid-open Utility Model Publication No. 5-26278 discloses a battery-powered device that stops the supply of current to a motor when the detected battery voltage has decreased below a predetermined value. In addition, the battery-powered device of Japanese Laid-Open Patent Publication No. 7-1350 stops the flow of current from the rechargeable batteries by turning OFF a switch when the remaining battery capacity has decreased below a predetermined value or when an overload has been applied to the batteries. That is, the switch is turned OFF in order to positively stop the flow of current. Thus, the remaining battery capacity is prevented from further decreasing.

In each of the above-described device, the battery powered device is prevented from being driven using insufficient power, which might cause the work operation to be incompletely performed. In addition, by preventing the rechargeable batteries from being excessively discharged, damage to the rechargeable batteries may be prevented.

However, if rechargeable batteries are charged when the remaining battery capacity is relatively large or high (i.e., it the rechargeable batteries are recharged before the remaining battery capacity has been appropriately reduced), the amount or energy that can be supplied from the fully charged battery (hereinafter referred to as "fully charged battery capacity") may decrease due to "memory effects." Moreover, if the charging operation is repeatedly performed before the remaining battery capacity has substantially decreased, the fully charged battery capacity will remarkably decrease. Therefore, various techniques have been proposed in order to overcome the problem of memory effects and to prevent a reduction in the fully charged battery capacity.

Generally speaking, the usable life of rechargeable batteries (e.g. nickel-cadmium batteries, nickel metal hydride batteries, etc.) can be prolonged by recharging the batteries before the remaining battery capacity of the batteries has substantially decreased. In other words, if the batteries are permitted to repeatedly and substantially discharge in order to prevent the fully charged battery capacity from decreasing (i.e., to prevent memory effects), the batteries may be irreparably damaged, thereby reducing the usable battery life. However, if the batteries are repeatedly charged before a substantial decrease of the remaining battery capacity in order to prevent damage to the batteries, the fully charged battery capacity generally decreases due to memory effects.

As disclosed in above-mentioned Japanese Examined Utility Model Publication No. 4-32224, Japanese Unexamined Utility Model Publication No 5-26278, and Japanese Unexamined Patent Publication No. 7-1350, battery usage is stopped before the remaining battery capacity has substantially decreased in order to prolong the battery life. However, memory effects will eventually decrease the fully charged battery capacity, thereby reducing the usable life of the battery between changing and discharging at one cycle.

It is, accordingly, one object of the present teachings to teach methods and apparatus that overcome one or more problems of the known art. In one aspect of the present teachings, the fully charged battery capacity of recharageable batteries may be prevented from decreasing due to memory effects without damaging the batteries by excessive discharging, thereby ensuring a long battery life.

In another aspect of the present teachings, apparatus are taught that may include means for detecting the voltage level of the rechargeable batteries. Further, the apparatus may also include means for changing (selecting) a reference voltage level that is utilized for comparison with the detected battery voltage level. The reference voltage level preferably is selected from at least two different reference voltage levels and the selection is preferably based upon use history (or usage history) of the rechargeable batteries.

In another aspect of the present teachings, apparatus also may optionally include means (e.g., audio and/or visual means) for warning an operator that rechargeable batteries, which supply power (current) to a battery-powered device, have been discharged to the selected reference voltage level. As noted above, the reference voltage level can be changed during operation and the reference voltage level is preferably selected based upon use history information of the rechargeable batteries. Thereafter, when the remaining battery capacity has decreased below the selected (or set) reference voltage level, a warning is given to the operator. The reference voltage level is preferably selected so as to prevent damage to the rechargeable batteries due to excessive discharging while also preventing memory effects caused by prematurely recharging the rechargeable batteries. Thus, in accordance with this aspect of the present teachings, the fully charged battery capacity of the rechargeable batteries can be prevented from decreasing due to memory effects and the useful battery life can be prolonged as compared to the known art.

In another aspect of the present teachings, apparatus optionally may include means for stopping (shutting off) the flow of current from the rechargeable batteries to the battery-powered device. The current stopping (shutting off) means optionally may be utilized together with the warning means or instead of the warning means. In this aspect, the flow of current may be stopped, e.g., when the rechargeable batteries have been discharged to the selected reference voltage level. As described further above and below, the reference voltage level can be selected based upon the use history of the rechargeable batteries. In this aspect as well, the fully charged battery capacity of the rechargeable batteries can be prevented from decreasing due to memory effects and the life of the rechargeable batteries can be prolonged.

In another aspect of the present teachings, the means for changing (selecting) the reference voltage, level preferably utilizes a predetermined condition in order to determine whether to change the reference voltage level. For example, when the use story does not satisfy a predetermined condition, priority is given to preventing the usable battery life from decreasing (e.g. preventing damage caused by excessive discharge). On the other hand, when the use history satisfies the predetermined condition, priority is given to preventing the fully charged battery capacity from decreasing due to memory effects. Thus, it is possible not only to prevent the fully charged battery capacity of the rechargeable batteries from decreasing (e.g., due to memory effects), but also to extend the life of the batteries by preventing damage caused by excessive discharge of the batteries.

These aspects and features may be utilized singularly or in combination in order to make improved rechargeable battery packs, battery chargers, power tools and other battery-powered devices and adapters for use with rechargeable battery packs. In addition, other objects, features and advantages of the present teachings will be readily understood after reading the following detailed description together with the accompanying drawings and the claims. Of course, the additional features and aspects disclosed herein also may be utilized singularly or in combination with the above-described aspects and features.

Before proceeding with a detailed discussion of the present teachings, the accompanying drawings will be briefly described as follows.

DETAILED DESCRIPTION OF THE INVENTION

Figure 1:
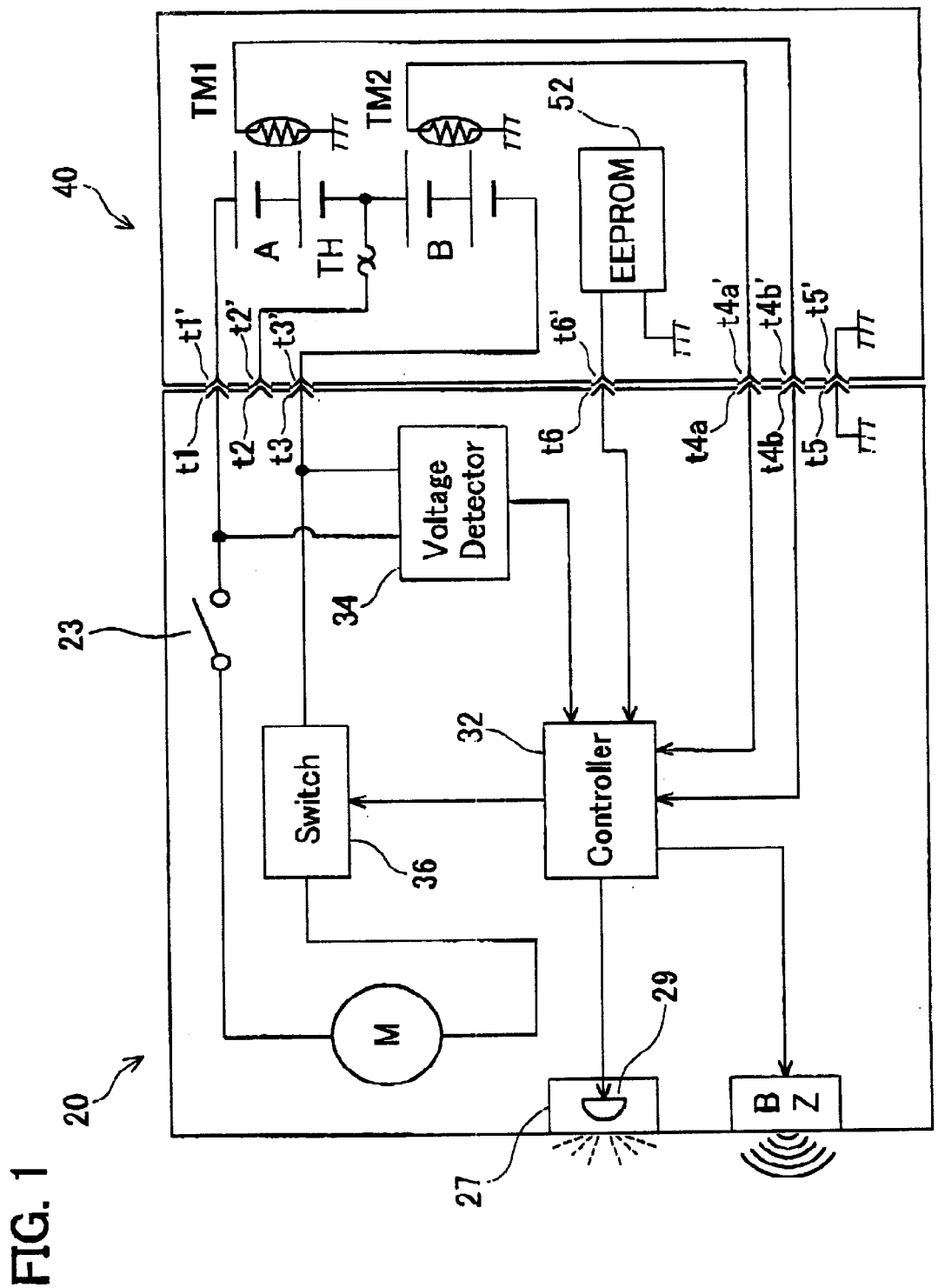
FIG. 1 is a schematic diagram of a representative electric circuit according to a first representative embodiment of the present teachings.

In one embodiment of the present teachings, apparatus are taught that may include a voltage detector capable of detecting the voltage level of at least one rechargeable battery. Further, a controller or processor may compare the battery voltage level detected by the voltage detector to one of a plurality of reference voltage levels. Preferably, the controller selects an appropriate reference voltage level based upon use history of the rechargeable batteries stored, which usage history may be stored in a memory. In addition, the controller may indicate to an operator that the rechargeable batteries are due for recharging when the detected battery voltage level equals or becomes less than the selected reference voltage level (or a derivative of the selected reference voltage level).

The controller may select a first reference voltage level when the use history does not satisfy a predetermined condition. The controller may select a second reference voltage level when the use history satisfies the predetermined condition. The second reference voltage level may be lower than the first reference voltage level. In addition or in the alternative, the second reference voltage level may reflect a deeper discharge of the recharageable batteries that the first reference voltage level.

Optionally, at least one means may be provided for warning an operator that the rechargeable batteries are due for recharge when the detected voltage of the rechargeable batteries becomes equal to or less than the selected reference voltage level (or a derivative of the selected reference voltage level). Various warning means will be appropriate for use with the present teachings, including but not limited to visual mean e.g., lights or displays) and audio means (e.g., sound emitting devices).

Optionally, means may be provided for shutting off electric current supplied by the rechargeable batteries to a load (e.g., a power tool motor) when the detected voltage of the rechargeable batteries becomes equal to or less than the selected reference voltage level or the selected reference voltage level minus a small voltage (EV.ΔV). Such means may automatically disconnect the batteries from the load in order to prevent the rechargeable batteries from being excessively discharged, which may reduce the usable life of the batteries.

In another embodiment of the present teachings, both the warning means and the current shutting off means may be provided. For example, the warning means may indicate to the operator that the rechargeable batteries are due for recharging when the detected battery voltage becomes less than the selected reference voltage level. Further, the electric current supplied by the rechargeable batteries to the load may he cut or stopped when the detected battery voltage becomes equal to or less than the selected reference voltage level minus a small voltage (EV.ΔV). Thus, if the operator does not discontinue use of the rechargeable batteries before the detected battery voltage falls below the selected reference voltage level minus a small voltage (EV.ΔV), the current shutting off means may automatically stop the supply of electric current from the rechargeable batteries to the load.

Naturally, each of these embodiments advantageously may be utilized with power tools and other battery-powered devices in order to prolong the usable life of the rechargeable batteries.

Methods are also taught for determining an appropriate timing for recharging at least one rechargeable battery. For example, the voltage level of the at least one rechargeable battery may be detected (e.g., repeatedly detected). Either before or after the voltage detection step, a reference voltage level may be selected from a plurality of reference voltage levels based upon use history of the at least one recharagble battery. The reference voltage level and the use history information may be retrieved from a semiconductor memory. The detected battery voltage level may then be compared to the selected reference voltage level. Further, an indication may be provided to an operator that the at least one rechargeable battery is due for recharging when the detected battery voltage level becomes equal to or less than the selected reference voltage level (or a derivative of the selected reference voltage level). Optionally, the method may further include shutting off electric current supplied by the rechargeable batteries when the detected battery voltage becomes equal to or less than the selected reference voltage level minus a small voltage (EV.ΔV). In addition, current may be supplied from the at least one rechargeable battery to a motor of a power tool while detecting the voltage level of the at least one rechargeable battery.

In a further embodiment of the present teaching, apparatus are taught for determining an appropriate timing for recharging at least one rechargeable battery. Such apparatus may include means for detecting the voltage level of the at least one rechargeable battery. Means may be provided to store a plurality of reference voltage levels and use history information concerning the at least one rechargeable battery. In addition, means may be provided for selecting a reference voltage level from a plurality of reference voltage levels based upon the use history for the at least one rechargeable battery. Means also may be provided for comparing the detected battery voltage level to the selected reference voltage level (or a derivative of the selected reference voltage level). Further, means may be provided for indicating to an operator that the at least one rechargeable battery is due for recharging when the detected battery voltage level becomes equal to or less than the selected reference voltage level. A controller or processor may perform one or more of these functions. Further, such apparatus may be attached to, or included within, power tools, adapter; for power tools and/or battery packs.

Each of the additional features and method steps disclosed above and below may be utilized separately or in conjunction with other features, elements and method steps to provide improved battery usage and charging techniques. Detailed representative examples of the present teachings, which examples will be described below, utilize many of these additional features and method steps in conjunction. However, this detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the present teachings in the broadest sense, and are instead taught merely to particularly describe representative and preferred embodiments of the present teachings, which will be explained below in further detail with reference to the figures. Of course, features and steps described in this specification and in the dependent claims may be combined in ways that are not specifically enumerated in order to obtain other usual and novel embodiments of the present teachings and the present inventor expressly contemplates such additional combinations.

First Detailed Representative Embodiment

Figure 2:
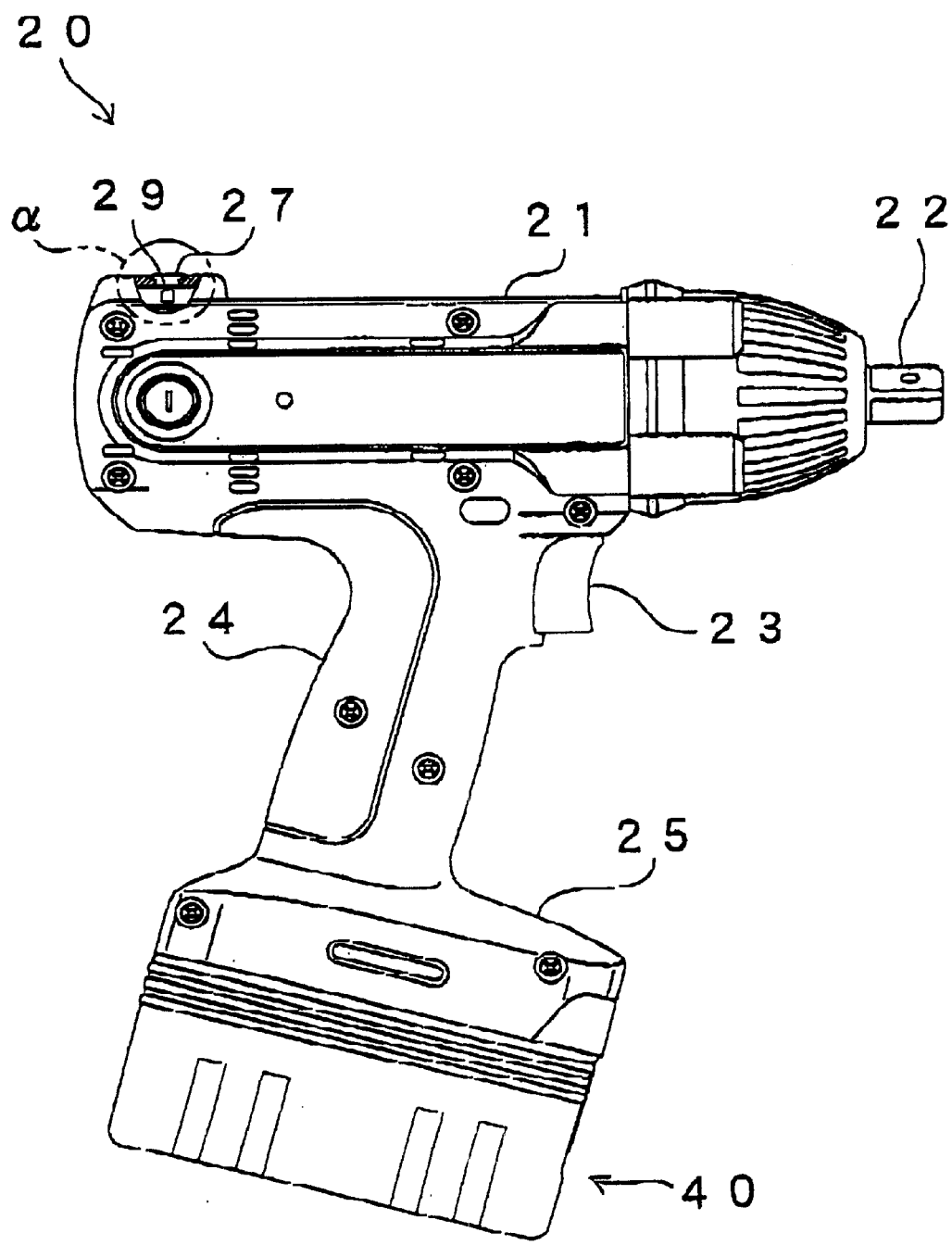
FIG. 2 shows a representative exterior of a first representative power tool.
Figure 3:
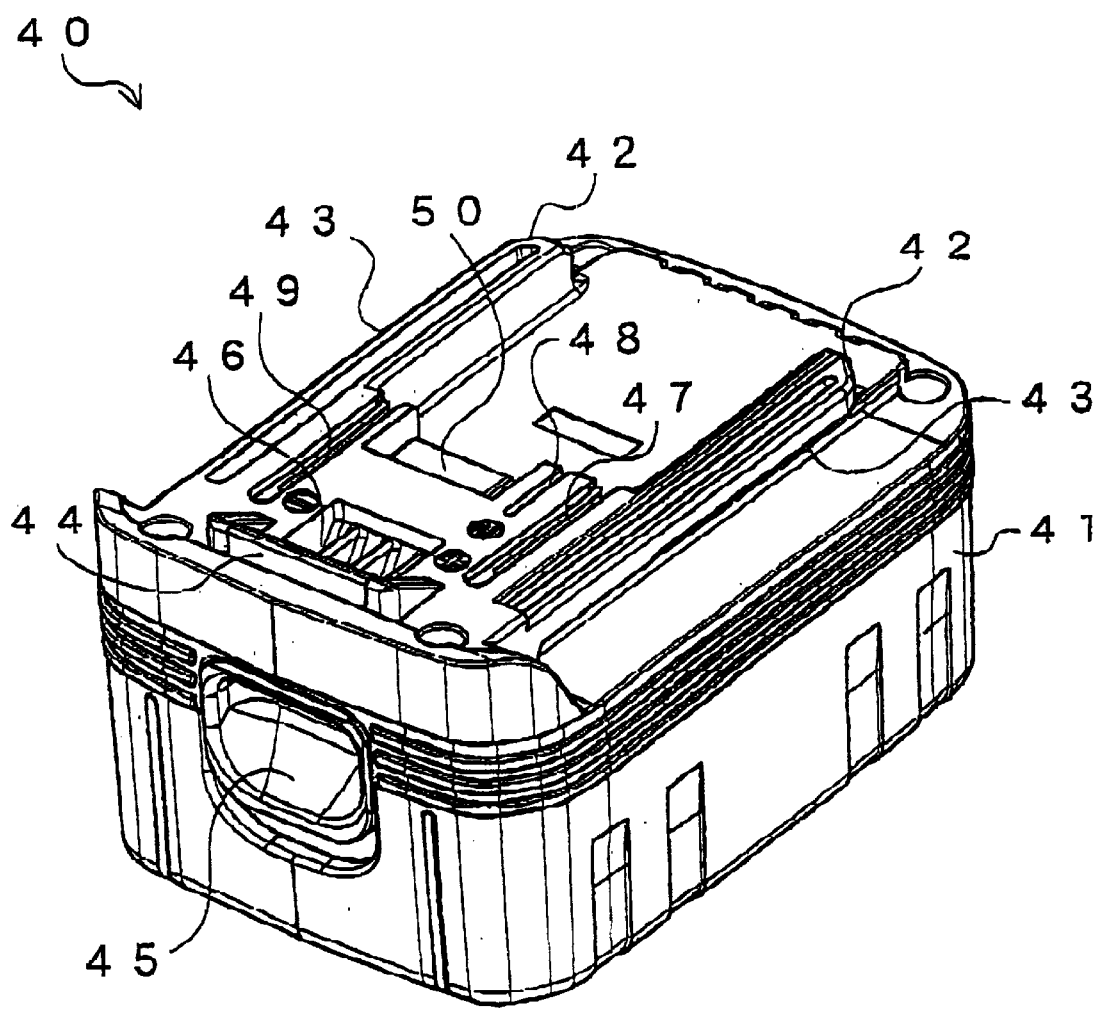
FIG. 3 shows a representative exterior of a first representative battery pack, which can be connected to the first representative power tool.

FIG. 1 shows a block diagram of a representative electric circuit for battery pack 40 and a representative electric circuit for power tool 20. Naturally, battery pack 40 can be attached to power tool 20 in order to supply current to power tool 20. FIG. 2 shows a representative outer appearance for power tool 20 and FIG. 3 is a perspective view showing a representative outer appearance for battery pack 40. In addition, FIG. 2 shows a partial cross-sectional view within circle α, which is indicated by a two-dot chain line.

Referring to FIG. 2, power tool 20 may include main housing 21, grip or handle 24, and battery-pack mount 25. A motor M (see, FIG. 1) may be disposed within main housing 21 and may rotatably drive a tool (not shown) attached to chuck 22 handle 24 is preferably disposed between battery-pack mount 25 and housing 21. Battery pack 40 preferably can be removably attached to battery-pack mount 25. As shown in FIG. 1, battery-pack mount 25 may include positive terminal t1 and negative terminal t3, which can respectively connect with positive terminal t1' and negative terminal t3' of battery pack 40. Thus, drive power (current) may be supplied via terminals t1, t3 in order to drive motor M.

As shown in FIG. 2 switch 23 may be slidably mounted within handle 24 and switch 23 may be actuated (i.e., shifted to the ON position from the OFF position) when the switch 23 is inwardly depressed. When switch 23 is actuated, current is supplied to drive motor M from battery pack 40. For example, switch 23 may be electrically disposed between positive terminal t1 and drive motor M, as shown in FIG. 1. Therefore, switch 23 may control the supply and stoppage of current from battery pack 40 to power tool 20. When switch 23 is maintained in the depressed position, current is continuously supplied from battery pack 40 to drive motor M. As a result, chuck 22 will rotate at predetermined torque in predetermined direction.

Referring again to FIG. 2, light emitter 27 may be disposed at the end of main housing 21 that is opposite to chuck 22. Light emitter 27 may include one or more light emitting diodes (LED) 29, although other illumination means may be utilized, such as one or more incandescent lamps. LED 29 may be illuminated when controller 32 executes a stored control program and determines that battery pack 40 is due to be recharged. Representative battery usage control program for determining when to illuminate light emitter 27 will be describe in further detail below. In one representative embodiment, LED 29 may, e.g., be illuminated when a predetermined timing for charging battery pack 40 (i.e., the best timing for charging battery pack 40) has arrived. Thus, when LED 29 is illuminated, the operator will know that usage of battery pack 40 should be promptly stopped and battery pack 40 should be recharged without further usage.

Referring back to FIG. 1, the representative electric circuit of power tool 20 will be further explained. For example, power tool 20 may include processor or controller 32, voltage detector 34, switch 36, LED 29, buzzer BZ, and drive motor M.

Controller 32 may preferably include an integrated microprocessor, which may include, e.g., a central processing unit, a main memory, input and output (I/O) interfaces, various kinds of registers, and other circuits. A variety of microprocessor and memories may be utilized for controller 32 and this aspect of the present teaching is not particularly limited. The control program may include instructions for transferring data between the central processing unit and voltage detector 34/switch 36 via the I/O interfaces.

Voltage detector 34 may detect the battery voltage (Vbatt) of battery pack 40 and output a signal to controller 32. Voltage detector 34 may include two inputs. One input may be coupled to a positive battery terminal and the other input may be coupled to a negative battery terminal. Tho output of voltage detector 34 may be coupled to controller 32.

Voltage detector 34 may include, e.g., an A/D converter that converts an imput voltage between terminals t1 and t3 from an analog signal to a digital signal. The digital signal may naturally consist of a bit string having a predetermined number of bits. Then, voltage detector 34 may communicate the digital signal to controller 32. Thus, the battery voltage Vbatt of battery pack 40 across terminals t1 and t3 can be input to controller 32 as digital information and controller 32 can obtain battery voltage information from battery pack 40.

Voltage, detector 34 is not required to include an A/D converter. Instead, voltage detector 34 may include e.g., a plurality of voltage determination circuits, which are provided at particular voltage intervals. Each voltage determination circuit may include a comparator and a reference voltage source. If voltage determination circuits are utilized, component costs can be reduced, as compared to an A/D converter. Naturally, voltage detector 34 may be constituted in various ways that are well known in the art and the present teachings are not particularly limited in this regard.

Switch 36 may include, e.g., a semiconductor device (e.g., a transistor) that functions to electrically connect or disconnect a power source circuit to the drive motor M. For example, the power source circuit may extend from terminals t1, t3 to drive motor M. Although other switches naturally may be utilized with the present teachings switch 36 may preferably be, e.g., a power MOSFET. Generally speaking, a MOSFET is capable of electrically connecting a drain terminal and a source terminal when a predetermined voltage is applied e.g., to a gate terminal. Therefore, the gate terminal of switch 36 is preferably coupled to an output port of controller 32, the drain terminal is preferably coupled to drive motor M, and the source terminal s preferably coupled to negative terminal t3. In the alternative, the source terminal may be coupled to drive motor M an the drain terminal may be coupled to negative terminal t3. A predetermined voltage may be applied to the gate terminal, e.g., via a driver circuit (not shown).

LED 29 may emit e.g., red visible light, when current flows though LED 29. LED 29 may be coupled to an output port of controller 32, e.g., via the driver circuit, and may be controlled so as to illuminate in response to a predetermined signal that is supplied from controller 32. Thus, using a control program, LED 29 can be illuminated when battery pack 40 is due to be recharged, because the battery voltage has dropped to a specified reference voltage level.

In addition or in the alternative, buzzer BZ may be coupled to an output port of controller 32 via the driver circuit and may be selectively actuated so as to emit a warning sound in response to output signals from controller 32. Thus, using the control program, buzzer BZ can emit a warning sound when battery pack 40 should be recharged. Accordingly, the warning sound can inform the user that battery pack 40 is ready for charging.

Drive motor M may preferably include an electric motor, in which a rotor (not shown) rotates due to current that is supplied from battery pick 40 when switch 23 is actuated. Generally speaking, drive motor M may also include a stator (not shown) that is disposed around the rotor. Chuck 22 may be affixed to a shaft that rotates together with the rotor. Therefore chuck 22 will rotate when switch 23 is actuated.

A representative exterior structure for battery pack 40 will now be described with reference to FIGS. 1 and 3. Battery pack 40 may include a hard resin or plastic casing 41. Casing 41 may have, e.g., a substantially rectangular shape, although a variety of shapes may be utilized and the present teachings are not limited in this respect. One or more battery cells, e.g., nickel metal hydride (NMH) battery cells, may be disposed within casing 41 and the respective battery cells may be electrically connected in series. Hereinafter, the electrically connected battery cells will be referred to as a "cell group. " Further, the battery cells optionally may be divided into two blocks A, B, as shown in FIG. 1. Casing 41 also may enclose temperature sensors TM1, TM2, which are disposed so as to detect battery cell temperatures of the corresponding blocks A and B, and EEPROM 52, which stores pertinent information, such as the use history of the cell group. Further, thermocouple TH may be provided in order to automatically cut or stop the supply of current to motor M, if the battery temperature increases above a threshold temperature. Thus, thermocouple TH may prevent damage to the batteries by stopping usage of the batteries before the batteries reach an excessive temperature.

The use history and other specific information are not required to be stored in an EEPROM, because a variety of different type of semiconductor memory elements may be utilized to store this information. For example a DRAM, an SRAM, an SDRAM, an EDRAM, or other types of memory, also can be effectively utilized with the present teachings. In the alternative, a memory card may be effectively utilized and the memory card may include a DRAM, SRAM, SDRAM, EDRAM, etc.

Referring to FIG. 3, fitting portions 42 optionally may be defined on an upper surface of easing 41 in the form of a pair of parallel-disposed rails. Each fitting portion 42 may include a fitting groove 43 that can engage the above-described power tool 20 or can engage a battery charger (not shown). In addition, hook 44 optionally may be disposed so as to vertically project or retract from the upper surface of casing 41, e.g., near one end of fitting portions 42. Further, vent 46, positive terminal groove 47, center terminal groove 48, negative terminal groove 49, connector 50, and other structure optionally may be defined or provided on the upper surface of casing 41.

Hook 44 may be integrally formed with lever 45, which may be disposed on one side of casing 41. A coil spring (not shown) may upwardly bias or urge hook 44. When battery pack 40 is attach to power tool 20 or a battery charger, hook 44 may engage a corresponding hook groove that is defined on power tool 20 or the battery charger. Therefore, battery back 40 is prevented from easily detaching from power tool 20 or the battery charger. On the other hand, by pushing down level 45 against the biasing force of the coil spring and thus towards the lower end of casing 41, hook 44 will inwardly retract into casing 41. As a result, hook 44 will disengage from the hook groove, thereby enabling battery pack 40 to be detached from power tool 20 or the battery charger.

Positive terminal groove 47, center terminal groove 48, and negative terminal groove 49 may respectively include positive terminal t1', center terminal t2', and negative terminal t3'. Each terminal t1', t2' and t3' may be soldered to a printed circuit board that is disposed within casing 41. When battery pack 40 is attached to power tool 20 or the battery charger, the terminals t1', t2' and t3' may respectively contact corresponding terminals. Positive terminal t1' and negative terminal t2' may be respectively connected to the positive electrode of block A and the negative electrode of block B of the cell group that is disposed within casing 41. Connector of blocks A and B of the call group are electrically connected to center terminal t2' via thermostat TH.

Connector 50 may be exposed on the upper surface of casing 41 and also may be soldered to the printed circuit board that is disposed within casing 41. As shown in FIG. 1, a plurality of connection terminals, t4a', t4b', t5', t6' may be disposed within connector 50. When battery pack 40 is attached to power tool 20 or the battery charger, the connection terminals may selectively transmit or receive specific information between battery pack 40 and power tool 20 or between battery pack 40 and the battery charger. In the representative embodiments, connector 50 may, e.g., transmit use temperature information, which temperature information is detected by temperature sensors TM1, TM2 that are disposed within battery pack 40. Further, connector 50 may selectively transmit or receive use history information (e.g., level of battery discharge) that is stored in EEPROM 52.

Figure 15:
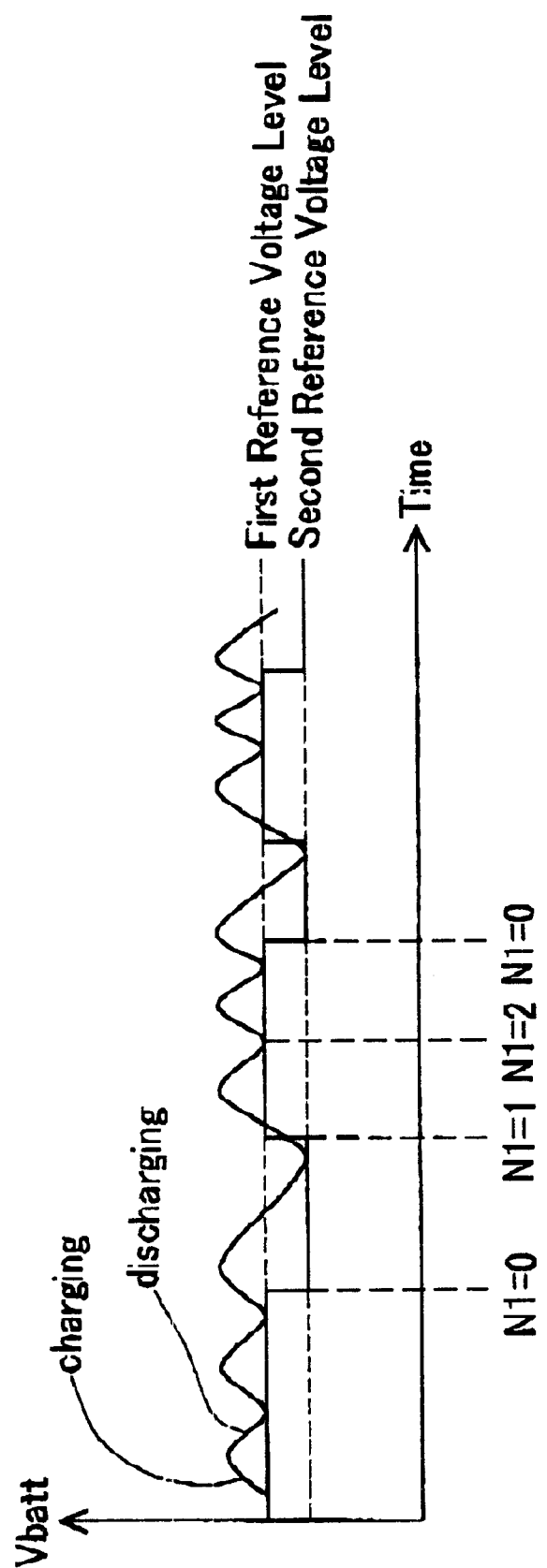
FIG. 15 shows a representative charging and discharging pattern for rechargeable batteries.

Referring to FIGS. 4 to 6 and 15, representative battery usage control program for controller 32 will be described, which programs determine when battery pack 40 is due to be recharged in accordance with the present teachings. The control program may be stored in the memory of controller 32 and may be executed by the central processing unit. FIG. 15 shows an idealized usage pattern for battery pack 40. For example, the battery pack 40 may be permitted to discharge to a first voltage level (voltage drop) for one or more uses before the battery pack 40 is due for recharging. However, periodically (e.g., 1 out of every 3 use cycles), the battery pack 40 may be permitted to discharge to a lower voltage level (i.e., a larger voltage drop) before the control program determines that the battery pack 40 is due to be recharged.

As discussed further below, the control program optionally may include instruction for warning the operator of the appropriate timing to stop usage of battery pack 40 and to recharge the battery pack 40. For example, the control program may include instructions to change the reference voltage drop (voltage discharge level) to which the battery cells will be permitted to discharge before the battery pack 40 should be recharged. Thus, in one preferred embodiment, battery pack 40 may be permitted to discharge only to a relatively shallow voltage drop (i.e., a relatively high reference voltage) for two consecutive times before a warning is provided to the operator. In each case, the battery pack 40 should be recharged when the battery voltage drops to the relatively high reference voltage, even though the battery voltage has not dropped very much. This aspect of the present teachings will assist in prolonging the usable life of battery pack 40.

However, on the third usage, battery pack 40 may be permitted to supply current to power tool 20 until the battery voltage has reached a relatively low reference voltage (i.e., a relatively larger voltage drop has occurred), as shown in FIG. 15. This aspect of the present teachings will assist in preventing the battery pack 40 from developing a "memory," as was discussed above.

Such a charge/discharge cycle may be repeated so that battery life can be extended. That is, if the batteries are typically only permitted to discharge to a relatively high reference voltage level, damage due to over-discharge of the batteries can he minimized. However, memory effects also can be prevented by occasionally or periodically allowing the batteries to discharge to a relatively low reference voltage level.

Figure 4:
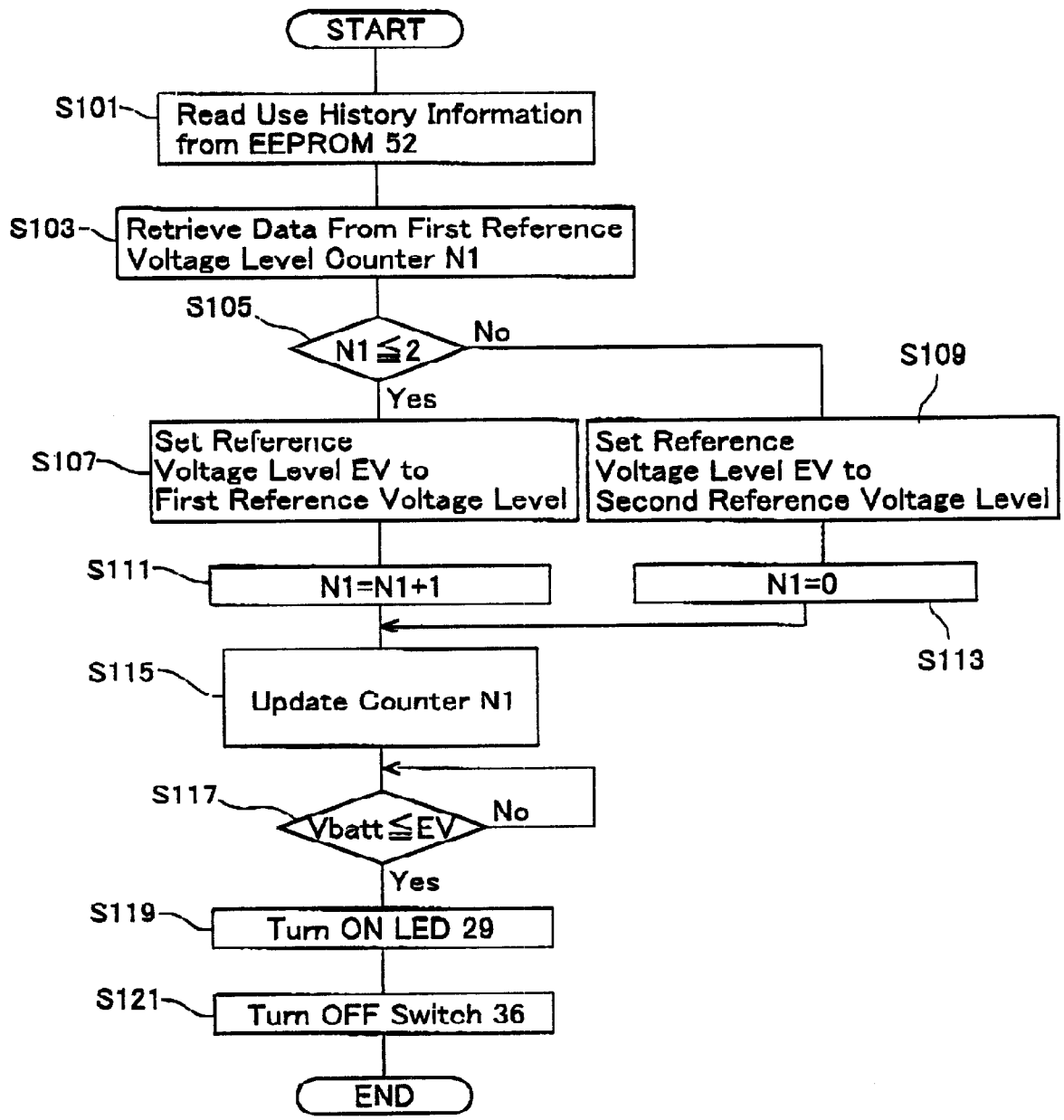
FIG. 4 is a flowchart of a first representative battery usage control process.

FIG. 4 shows instructions or method steps for a first representative battery usage control program that may be utilized with the present teachings. For example, in step S101, use history information is first read from EEPROM 52 of battery pack 40 into controller 32 of power tool 20. The use history information may preferably include specific usage information that has been stored in EEPROM 52 from the first use of battery pack 40 until the present. Examples of such specific information include the number of times that battery 40 has been discharged and recharged, the voltage drop of each discharge, and battery temperatures (e.g., maximum temperatures) during discharge and/or recharging. The use history information may preferably include a first reference voltage counter N1, which stores the number of consecutive times that the batteries have been discharged to a first reference voltage level, which may e.g., be a relatively high voltage level in this embodiment.

In step S103, the controller 32 extracts the data concerning the number of times that battery pack 40 has been consecutively discharged to the first reference voltage level, e.g., from the first reference voltage level counter N1 (also referred to herein as "counter N1"). The data stored in counter N1 may be read separately from the specific usage information or may be included within the specific usage information that is read from EEPROM 52.

In the representative control program, the controller 32 then determines whether counter N1 is less than or equal to 2 (step S105). If counter N1 is less than or equal to 2 (Yes in step S105), reference voltage level EV is set so that a warning to recharge battery pack 40 is given when the battery voltage of battery pack 40 drops to the first reference voltage (i.e., a relatively high reference voltage) (step S107). On the other hand, if the counter N1 is greater than 2 in step S105, reference voltage level EV is set so that the warning is given when the battery voltage of battery pack 40 drops to a second reference voltage level, which second reference voltage level is lower than the first reference voltage level (step S109). Although the representative control program changes the reference voltage level EV based upon whether the counter N1 is greater than or less than 2, naturally this number may be an integer that is greater than 2, such as 3, 4, 5, etc.

In the first representative embodiment, reference voltage level EV is changed from the first reference voltage level to the second reference voltage level when the number stored in first reference voltage level counter N1 is greater than 2 (step S105). That is, if battery pack 40 has been consecutively discharged to the first reference voltage level (i.e., the higher reference voltage level) three times (No in step S105), battery pack 40 is then permitted to discharge to the second reference voltage level (i.e., the lower reference voltage level). This feature of the control program will prevent repetitious incomplete discharging of battery pack 40, thereby reducing or eliminating memory effects.

The first reference voltage level may be, e.g., set to 1.0 times the number of battery cells CL (V). In this case, the warning will be given when battery pack 40 has been discharged to a relatively shallow discharge level, e.g., when the battery voltage across each battery cell has dropped to 1.0 V (step S107). The second reference voltage level may be, e.g., set to 0.8 times the number of battery cells CL(V). In this case, the warning will be given when battery pack 40 has been discharged relatively completely, e.g., when the battery voltage across each battery cell has dropped to 0.8V (step S109). Naturally, the warning is provided in order to urge the operator to recharge battery pack 40.

If reference voltage level EV is set to the first reference voltage level in step S107, first reference voltage level counter N1 is incremented by one (N1=N1+1). The result of this addition is then written into EEPROM 52 (steps S111 and S115, respectively). On the other hand, if reference voltage level EV is set to the second reference voltage level (step S109), first reference voltage level counter N1 is cleared to zero (N1–0) and the value zero is written into EEPROM 52 (steps S113 and S115, respectively).

After the data in the first reference voltage level counter N1 has been updated (step S115), the battery voltage Vbatt of battery pack 40 is obtained from voltage detector 34. Then, the controller 32 determines whether the battery voltage Vbatt has dropped to the set reference voltage level EV (i.e., the first reference voltage level or the second reference voltage level). This determination step is repeated until the battery voltage Vbatt becomes equal to or less than the set reference voltage level EV. That is, the determination step (step S117) is performed again and again until the remaining battery capacity of battery pack 40 decreases to the set reference voltage level EV.

When the controller 32 determines that the battery voltage Vbatt of battery pack 40 has decreased to the set reference voltage level EV or below (Yes in step S117), battery pack 40 preferably should be recharged without further usage. Therefore, controller 32 may transmit a predetermined signal to LED 29 (in the subsequent step S119) in order to turn ON LED 29 and/or to actuate buzzer BZ. Then, controller 32 optionally may output another predetermined signal to switch 36 in order to change switch 36 from the ON state to the OFF state (step S121). Thus, if switch 36 is de activated, power tool 20 can not be operated again until controller 32 re-sets switch 36. Thus, by changing switch 36 to the OFF state in order to disable drive motor M, the operator of power tool 20 will be required to recharge battery pack 40 without further using battery pack 40. This optional feature of the representative control program ensures that the battery pack 40 is discharged to a proper level (i.e., but the battery pack 40 is prevented from being over-discharged), thereby extending the life of the battery pack 40.

When first reference voltage level counter N1 is greater than 2 (No in step S105), the process proceeds to step S109 in order to set reference voltage level EV to the second reference voltage level. However, step S105 may be expanded in order to provide for a third reference voltage level, a fourth reference voltage level, etc. For example, if first reference voltage level counter N1 is between 2 to 4, the reference voltage level EV may be set at the second reference voltage level. If first reference voltage level counter N1 is between 5 to 7, the reference voltage level EV may be set at the third reference voltage level. Preferably, the second reference voltage level is higher than the third reference voltage level. Furthermore, if first reference voltage level counter N1 is equal to or greater than 8, the reference voltage level EV may be set to the fourth reference voltage level. Preferably, the third reference voltage level is higher than the fourth reference voltage level. Thus, if additional reference voltage levels are provided, the optimum battery discharge level can be determined according to the use history of battery pack 40. Therefore, memory effects can be more reliably prevented thereby prolonging the life of battery pack 40.

Figure 5:
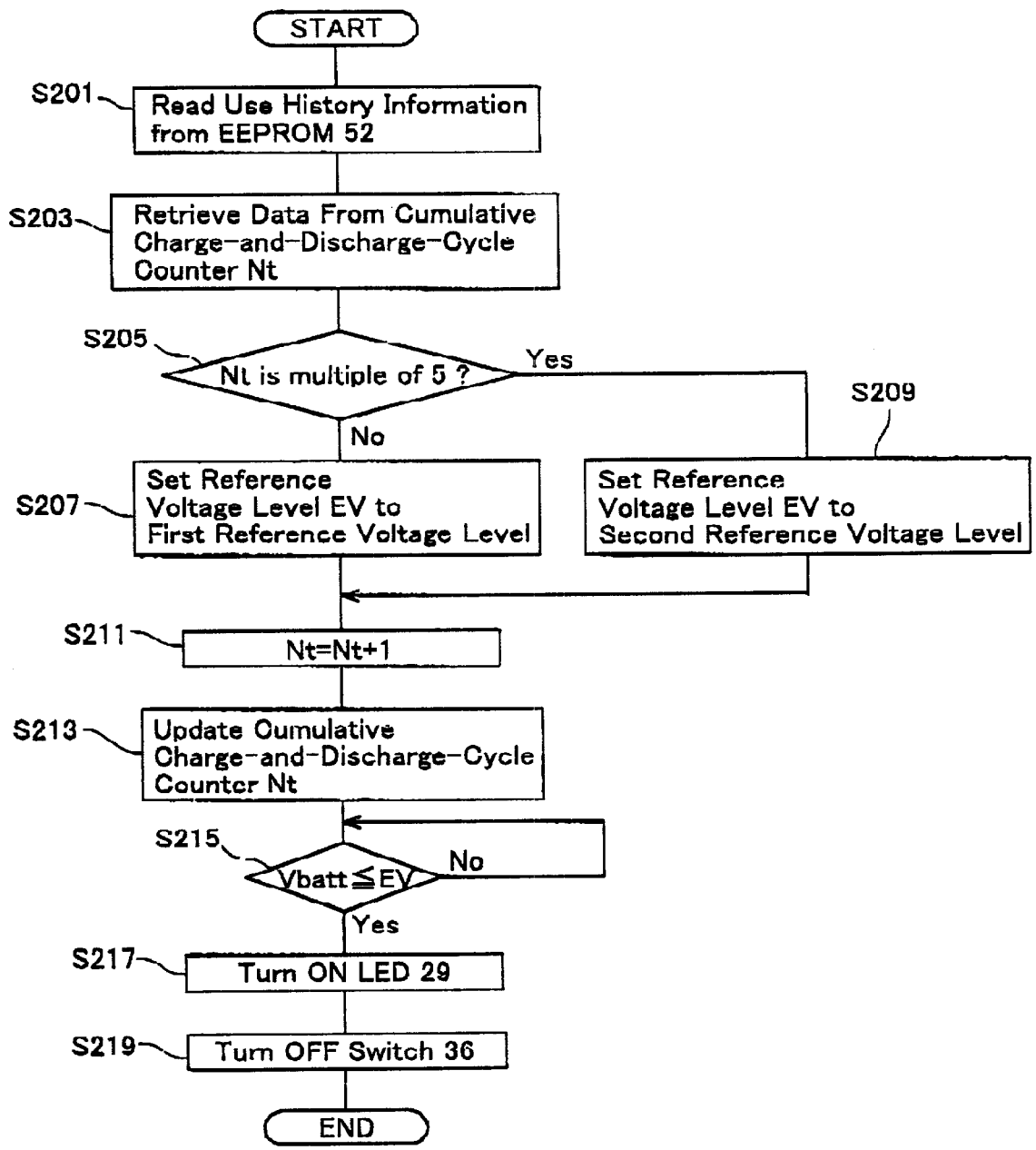
FIG. 5 is a flowchart showing a modification of the first representative battery usage control process.

In another embodiment of the present teachings, the control program shown in FIG. 4 may be modified. Thus, two modified control programs will be discussed with reference to FIGS. 5 and 6. Referring first to FIG. 5, the use history information, which is read in step S201, may include the cumulative number of times that battery pack 40 has been recharged after having been discharged from the first use of battery pack 40 until the present. For example, this information may be stored in a cumulative charge-and-discharge-cycle counter Nt, which counter Nt may be utilized instead of the above-described first reference voltage level counter N1. If the number stored in cumulative charge-and-discharge-cycle counter Nt is, e.g., a multiple of five, the reference voltage level EV may be changed from the first reference voltage level to the second reference voltage level. The designer is free to select an appropriate multiple and the present teachings are not particularly limited in this regard. Thereafter, steps S201, 215, 217, and 219 may be, generally speaking functionally equivalent to respective steps S101, 117, 119, and 121, which were described above with reference to FIG. 4. In step S211, a summation (or addition) operation may be performed in order to calculate the number that will be stored in cumulative charge-and-discharge-cycle counter Nt.

As noted above, cumulative charge-and-discharge-cycle-counter Nt may be utilized instead of first reference voltage level counter N1. Thus, when the number stored in cumulative charge-and-discharge-cycle counter Nt is a multiple of five, i.e., every five times, (Yes in step S205), reference voltage level EV is set to the second reference voltage level, which is a lower voltage than the first reference voltage level (step S209). Thus, battery pack 40 will be more completely discharged once out of every five charging cycles and memory effects can be reduced or eliminated.

Figure 6:
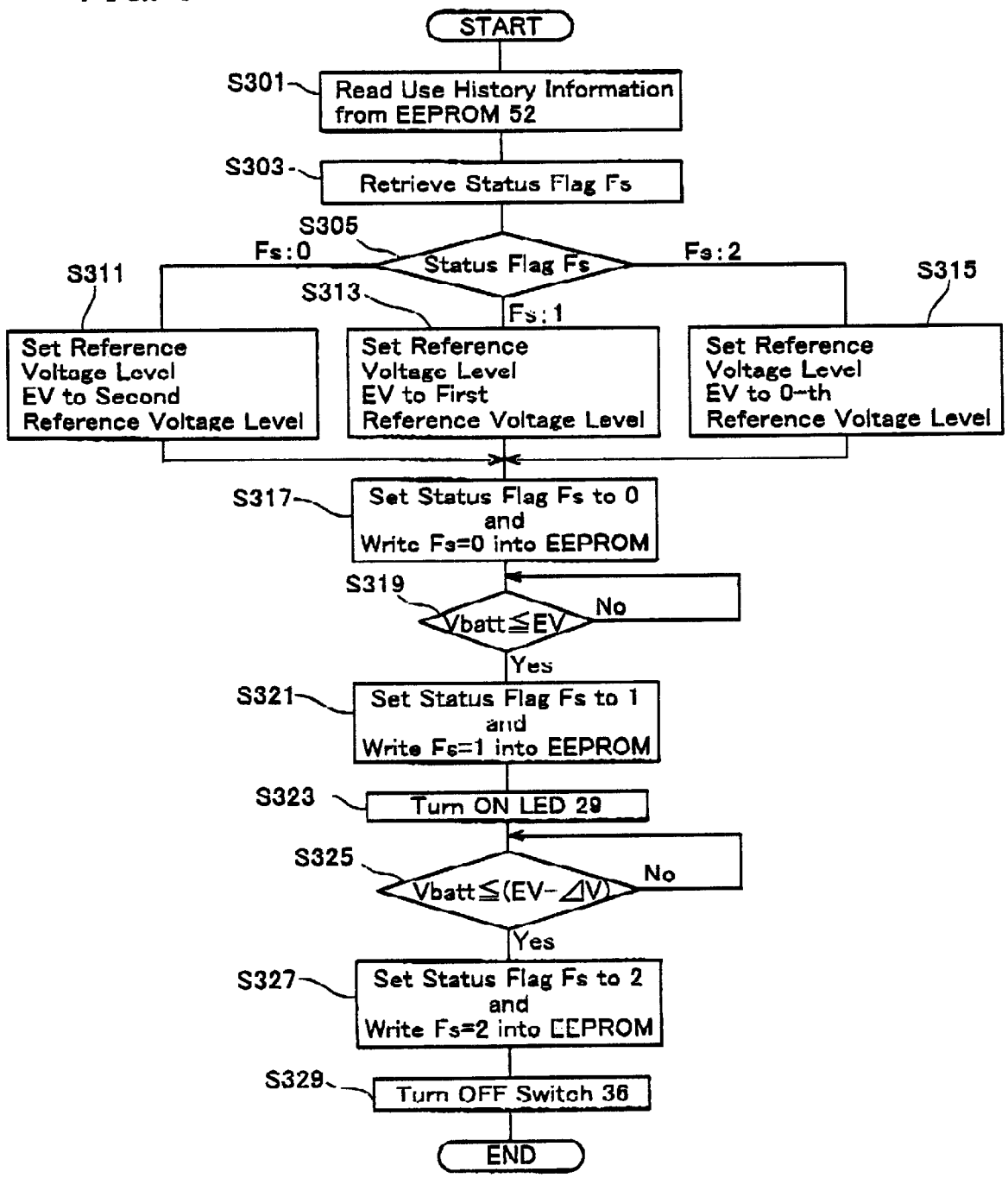
FIG. 6 is a flowchart showing another modification of the first representative battery usage control process.

FIG. 6 shows another modification of the representative control program. In this modification, the use history information is read in step S301 and a status flag Fs is retrieved from the use history information (step S303). Status flag Fs preferably may indicate the remaining battery capacity of battery pack 40 immediately after being disconnected from power tool 20 before the previous recharging operation. In the alternative, the status flag Fs may be generated based upon the use history information that is read in step S301. This status flag Fs may be utilized in order to determine the appropriate reference voltage level to set as reference voltage level EV, so that the battery cells will be discharged to the appropriate reference voltage level.

Status flag Fs may, e.g., a value or 0, 1, or 2 (i.e., the register for status flag Fs may be two bits). If battery pack 40 is removed from power tool 20 for recharging before the battery voltage Vbatt of battery pack 10 has decreased to the set reference voltage level EV, the status flag Fs will be set to 0 (Fs=0). It battery pack 40 is removed from power tool 20 for recharging when the battery voltage Vbatt is equal to or less than the set reference voltage level EV, but the battery voltage Vbatt is greater than or equal to the value EV. $\Delta$V, the status flag will be se to 1 (Fs=1). Moreover, it battery pack 40 is removed from power tool 20 for recharging when the battery voltage Vbatt is less than the value EV. $\Delta$V, the status flag will be set to 2 (Fs=2).

As discussed further below, the value of $\Delta$V may be utilized to provide a warning to the operator before opening switch 36 and thereby disabling power tool 20. For example, LED 29 may be lit and/or buzzer BZ may emit a warning sound before the power tool 20 is disabled by cutting current to the motor M (i,e, opening switch 36). Thus, the operator can complete the present power tool operation and the operator is not inconvenienced by power tool 20 abruptly stopping. However, the operator also will know that the current to motor M will be cut in the very near future in order to prevent the battery cells from being over-discharged. Therefore, the operator preferably will stop using power tool 20 shortly after LED 29 is illuminated and/or buzzer BZ emits a warning sound and remove battery pack 40 for recharging. However, if the operator does not stop using the power tool 20 in a timely manner, controller 32 will cause switch 36 to open and therefore, automatically disable power tool 20 in order to prevent battery pack 40 from being damaged due to over-discharge.

Thus, the value of status flag Fs may be determined in step S305 based upon the value of Fs that is stored in EEPROM 52. For example, the state Fs=0 may indicate that battery pack 40 was removed from power tool 20 for recharging before the battery voltage Vbatt decreased to (or below) the set reference voltage level EV. In this case, the reference voltage level EV will be set at the second reference voltage level, which is lower or less than the first reference voltage level. Because the previous discharge was not very deep before the previous recharge, then next battery discharge is preferably relatively deep. Thus, the second reference voltage level will be utilized.

The state Fs=1 may indicate that battery pack 40 was removed from power tool 20 for recharging when the battery voltage Vbatt was less than or equal to the set reference voltage level EV, but the battery voltage Vbatt was greater than or equal to EV. $\Delta$V. In this case, the reference voltage level EV is set at the first reference voltage level, which is higher or greater than the second reference voltage level. Thus, in this case, the batteries will be discharged to a medium discharge level before recharging.

Furthermore, the state F=1 may indicate that battery pack 40 was removed from power tool 20 for recharging when the battery voltage Vbatt was less than or equal to EV .$\Delta$V. In this case, the reference voltage level EV is set at a 0-th reference voltage level, which that is higher or greater than the first reference voltage level. That is, because the previous discharge was rather deep, the next discharge will be relatively shallow before the next recharging operation.

In step S317, status flag Fs is set to 0 and F=0 is written in EEPROM 52. The status flag Fs is set to 0 so that battery pack 40 will be removed from power tool 20 for recharging at about the time that the battery voltage Vbatt of battery pack 40 reaches the second reference voltage level. In the alternative, the battery charger may set the status flag Fs to 0.

The controller 32 determines that the battery voltage Vbatt of battery pack 40, which battery voltage is detected by voltage detector 34, is equal to or less than the set reference voltage level EV (step S319). This determination step (step S319) is repeated until the remaining battery capacity of battery pack 40 decreases to the set reference voltage level EV.

If controller 32 determines that the battery voltage Vbatt of battery pack 40 has become equal to or less than the set reference voltage level EV. (Yes in step S319), it would be appropriate to remove battery pack 40 from power tool 20 and recharge battery pack 40. Therefore, status flag Fs is set to 1 and Fs=1 is written in EEPROM 52 (step S321) In addition, controller 32 may output a predetermined signal to LED 29 in order to illuminate LED 29 (step S323) and/or to buzzer BZ in order to emit a warning sound. Thus, the LED 29 and/or buzzer BS may notify or warn the operator that battery pack 40 is due to be recharged. However, in the meantime, the operator is permitted to continue to utilize power tool 20 and battery pack 40, even though the battery voltage of battery pack 40 is less than or to the set reference voltage level EV. But, the operator preferably knows that further operation of power tool 20 should be quickly concluded in order to avoid automatic disablement of motor M, as further discussed below.

For example, if the operator continues to operate power tool 20 after receiving a warning (e.g., LED 29 has been illuminated and/or buzzer BZ has emitted a warning sound), the process optionally may proceed to step S325, in which controller 32 determines whether the battery voltage Vbatt of battery pack 40 has become less than or equal to the value (EV−$\Delta$V). If the battery voltage Vbatt is greater than (EV $\Delta$V), LED 29 remains illuminated, but the operator is permitted to continue to operate power tool 20. However, if the battery voltage Vbatt is equal or less than (EV−$\Delta$V), status flag Fs is set to 2 in step S327 and Fs−2 is written in EEPROM 52. Furthermore, switch 36 is turned OFF (deactivated) in order to stop the current supplied to motor M of power tool 20 (step S329), Consequently, the operator can not utilize power tool 20 again until a recharged battery pack 40 is installed in battery-pack mount 25. Thus, this optional feature of the representative control program prevents the batteries from being overly discharged, which would shorten battery life.

The representative control programs shown in FIGS. 5 and 6 may be further modified. For example, information concerning the battery temperature(s) during use (hereinafter, "use temperature history") may be included within the use history information stored in EEPROM 52. This use temperature information may be utilized in order to select the set reference voltage level EV. In one embodiment of this modification, if the battery cell temperature during the previous use of battery pack 40 was greater than a predetermined battery temperature threshold, the 0-th or first reference voltage level, which is relatively shallow, may be set as the reference voltage level EV. Thus, the amount of heat that will be generated when battery pack 40 is discharged in the next usage cycle can be minimized in order to protect the battery pack 40 from damage. Thus, because excess heat generation by battery pack 40 can be prevented during the next usage of battery pack 40 battery life can be extended.

As described above, LED 29, buzzer BZ, and controller 32 may be utilized to warn the operator that battery pack 40 has been discharged to predetermined reference voltage level EV. Therefore, battery pack 40 should be removed from power tool 20 and recharged in order to avoid damaging the battery cells within battery pack 40. In addition, controller 32 may change the set reference voltage level EV based upon the use history information, such as first reference voltage level counter N1, cumulative charge-and-discharge-cycle counter Nt, status flag Fs, and/or use temperature information, which is stored in EEPROM 52 of battery pack 40. Because the operator is warned that battery pack 40 should be removed and recharged, the operator can be certain that battery pack 40 will be recharged at the appropriate time in accordance with the use history of battery pack 40. Thus, this features allows further management of the amount of battery voltage discharge for each use of battery pack 40, thereby further preventing overdischarge and memory efforts in order to prolong the life of battery pack 40.

In addition, switch 36 and controller 32 may positively shut off the power supply to power tool 20 when battery pack 40 has been discharged to the set reference voltage level EV (or EV. $\Delta$V). Controller 32 may change the set reference voltage level EV based on the use history information concerning battery pack 40, such as first reference voltage level counter N1, cumulative charge and discharge-cycle counter Nt, status flag Fs, and/or use temperature information. Thus, because the current supplied to power tool 20 is automatically stopped or cut based upon the set reference voltage level EV (or EV. $\Delta$V), which reference voltage level EV has been selected according to the use history information of battery pack 40, it is possible to stop the use of battery pack 40 at an optimal timing according to the use history of battery pack 40. Thus, the level of battery discharge immediately before battery pack 40 is recharged can be managed, thereby preventing both over-discharge and memory effects. That is, it is possible to prevent memory effects and shortening of the life of battery pack 40 at the same time.

Further, in power tool 20 of the first representative embodiment, reference voltage level EV is set to the first reference voltage level when the use history, such as first reference voltage level counter N1 or cumulative charge-and-discharge frequency Nt, does not satisfy a predetermined condition. On the other hand, reference voltage level EV is set to at least the second reference voltage level, which is greater or deeper than the first reference voltage level, when the use history satisfies the predetermined condition. If battery pack 40 has discharged to the second reference voltage level when the use history satisfies the predetermined condition, LED 29 (and/or beer BZ) and controller 32 may warn the operator of the arrival of the timing to recharge battery pack 40. If the operator does not heed this warning, switch 36 and controller 32 will then automatically shut off the supply of current to motor M. Thus, when the use history (e.g., first reference voltage level counter N1 or cumulative charge-and-discharge-cycle counter Nt) meets the predetermined condition, battery pack 40 can he discharged more deeply than, when the use history does not meet the predetermined condition. As a result, battery pack 40 can be discharged to approximately the same depth as when a refresh function is actuated Therefore, this feature of the present teachings may prevent over-discharge and memory effects of battery pack 40) without decreasing the life of battery pack 40.

Second Detailed Representative Embodiment

Figure 7:
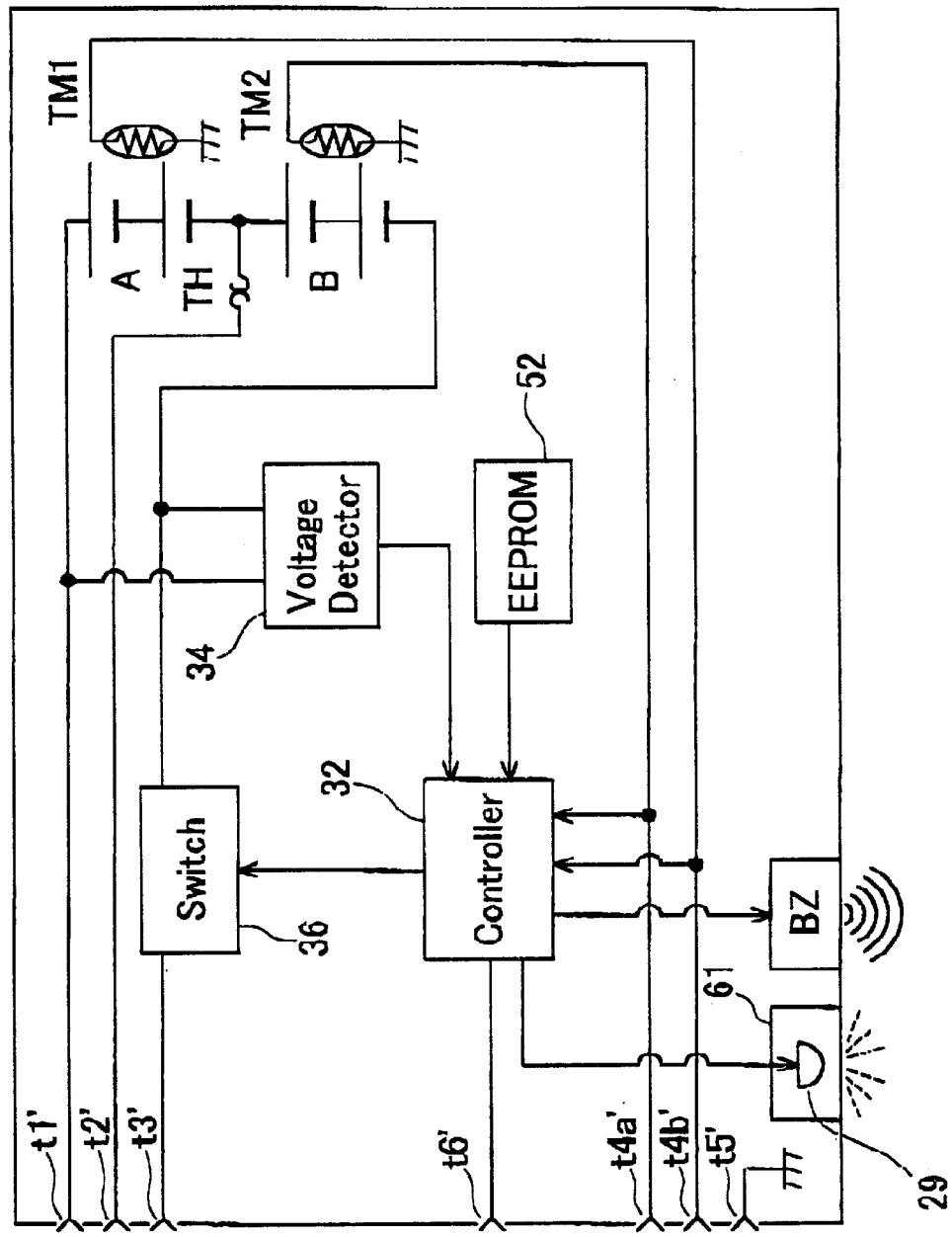
FIG. 7 is a schematic diagram of a representative electric circuit according to a second representative embodiment of the present teachings.
Figure 8:
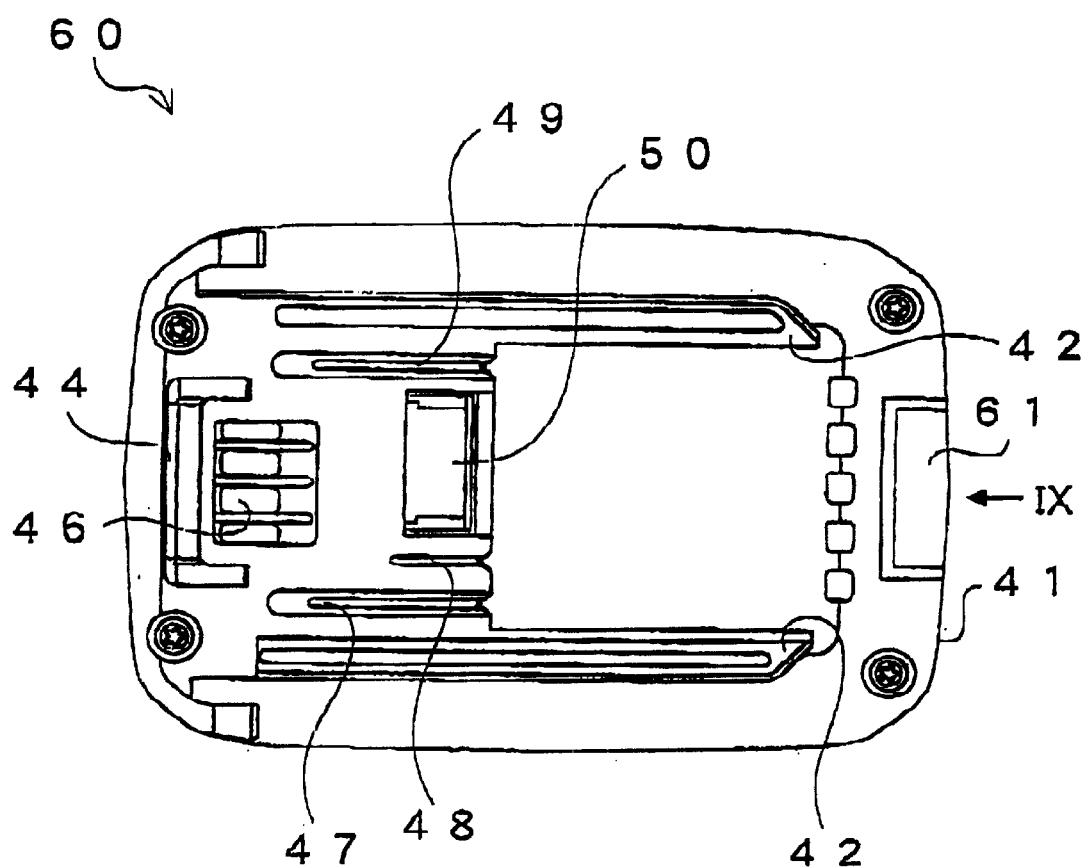
FIG. 8 is a plan view showing a representative exterior of a second representative battery pack.
Figure 9:
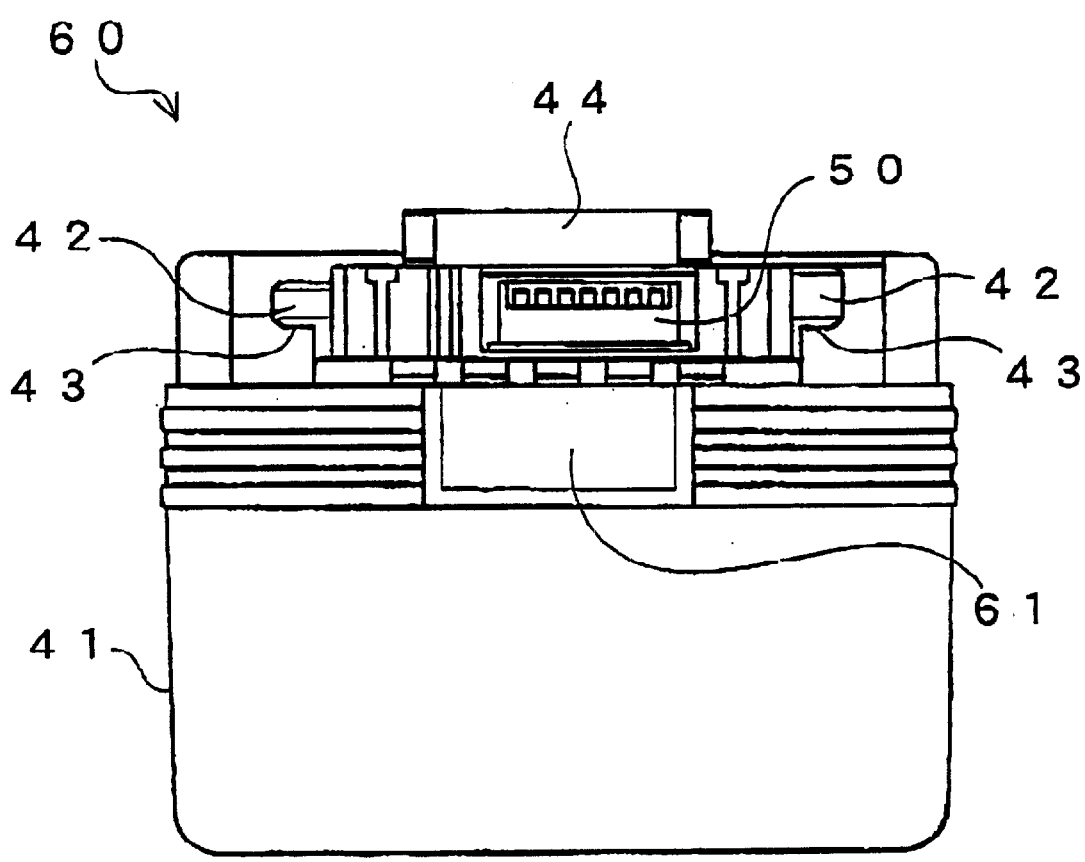
FIG. 9 is a side view of the battery park of FIG. 8 as viewed from the direction of arrow IX in FIG. 8.

Battery-powered devices according to a second representative embodiment of the present teachings will now be explained with reference to FIGS. 7 to 9. FIG. 7 is a block diagram showing a representative electric circuit of a second representative battery pack 60. FIGS. 8 and 9 are plan views showing the exterior of second representative battery pack 60.

Battery pack 60 may include controller 32, voltage detector 34, switch 36, buzzer BZ, and LED 29, which elements were disposed within power tool 20 in the first representative embodiment. However, the exterior of battery pack 60 may be substantially the same as the exterior of battery pack 40. Therefore, the same reference numerals will be utilized for the same parts and explanations of the same or similar parts may be omitted. In addition, controller 32 may execute one or more of the representative control programs shown in FIGS. 4–6, which representative control programs were discussed in detail above. Therefore, the description of the representative control program shown in FIGS. 4–6 is incorporated by reference into the second representative embodiment for use with battery pack 60. Thus, it is not necessary to describe those representative control programs again.

Although the exterior of battery pack 60 may be substantially the same as the exterior of battery pack 40, as shown in FIGS. 8 and 9, light emitter 61 may be disposed on an upper side of casing 41 under a window, which window may be made of a tinted or colorless transparent resin. Light emitter 61 may include at least one LED 29, as shown in FIG. 7. Thus, when controller 32 determines that battery pack 60 should be recharged based on the executed control program, LED 29 may be illuminated in order to warn the operator to recharge battery pack 40.

In addition, buzzer BZ may also be disposed within casing 41 of battery pack 60. For example, buzzer BZ may be connected to controller 32 via a driver circuit (not shown) in the same manner as LED 29. Thus, controller 32 may cause buzzer BZ to emit a warning sound when controller 32 determines that battery pack 40 is due for recharging. Therefore, by providing a warning sound, the buzzer BZ can inform the operator to stop using power tool 20 and recharge battery pack 60.

As shown in FIG. 7, the representative electric circuit of battery pack 60 may include elements that are substantially the same as the electric circuit of power tool 20, which was connected to the first representative battery pack 40. However, switch 23 and drive motor M naturally are not included within battery pack 60.

Similar to battery pack 40, battery pack 60 also may include a cell group (e.g., a plurality of nickel cadmium or nickel metal hydride batteries) that are electrically connected in series. Further, temperature sensors TM1, TM2 may be provided to detect the temperatures of the battery cells, if the battery cells have been divided into blocks A, B. In addition, thermocouple TH optionally may be provided in order to automatically stop further discharge of the battery cells if the temperature of the battery cells increases above a predetermined temperature threshold. Thus, thermocouple TH may optionally be utilized in order to prevent the battery cells from reaching excessive temperatures.

Thus, in the second representative embodiment, LED 29, buzzer BZ, and controller 32 have been transferred from power tool 20 to battery pack 60 and these parts may be utilized to warn the operator when it is time to recharge battery pack 60. For example, these elements may inform the operator when battery pack 60 has been discharged to the set (selected) reference voltage level EV. Similar to the first representative embodiment, controller 32 may change reference voltage level EV according to the stored use history information, such as first reference voltage level counter N1, cumulative charge and discharge cycle counter N1, status flag Fs or use temperature information, which may be stored in EEPROM 52 of battery pack 60. In fact, the second representative embodiment may utilize any of the representative control programs described above with reference to FIGS. 4–6. Therefore, the second representative embodiment may be designed to provide all, or substantially all, the same advantages and features as the first representative embodiment. Thus, it is not necessary to explicitly repeat the advantages and features of the first representative embodiment, which are instead incorporated into the second representative embodiment, by reference.

However, a summary of relevant features of representative battery packs will be provided. First, battery packs 60 are taught that may include one or more rechargeable batteries, which batteries may be utilized to supply current to a battery-powered device. Further, battery pack 60 may include means (e.g., a light and/or buzzer) for warning the operator that the rechargeable batteries should be recharged. For example, the warning means may inform the operator when the rechargeable batteries have been discharged to the set (selected) reference voltage level. In addition, battery pack 60 may include means (e.g., a processor or other controller) for changing the reference voltage level to which the rechargeable batteries will be discharged before the warning is provided. For example, the reference voltage level changing means may change the reference voltage level in accordance with the use history of the rechargeable batteries.

Thus, in such a battery pack, when the rechargeable batteries have been discharged to the predetermined reference voltage level, the warning means warns the operator that the rechargeable batteries should be recharged. The reference voltage level can be changed according to the teaching provided above, e.g., in accordance with the use history of the rechargeable batteries. The time that the warning is provided can be changed in a manner that will prevent over-discharging the rechargeable batteries, prevent memory effects and prolong the usable life of the rechargeable batteries in accordance with the present teachings.

In addition or in alternative to the wanting means, battery packs 60 may also include means (e.g., a processor and a switch) for automatically shutting off the supply of current to motor M when the rechargeable batteries have been discharged to the set (selected) predetermined reference voltage level EV (or EV. ΔV). That is, the above-described warning means optionally may be provided in this embodiment of the present teachings.

Thus, in such a battery pack, when the rechargeable batteries have been discharged to the set (selected) reference voltage level EV (or EV. ΔV), the supply of current to the battery-powered device (e.g., power tool 20) is automatically shut off. The reference voltage level(s) may be the same reference voltage level(s) that were used to warn the operator. In the alternative, if the warning means is provided with such battery packs, the reference voltage level(s) for automatically shutting off current may be lower than the reference voltage level(s) utilized to warn the operator. The reference voltage level changing mean may operate substantially in the same manner as describes above (e.g., the use history of the rechargeable batteries may be considered in order to set the appropriate reference voltage level EV).

In any of the above-described battery packs 60, the reference voltage level may be set to a first reference voltage level if the use history does not satisfy a predetermined condition. On the other hand, the reference voltage level may be set to at least a second reference voltage level, which is greater than the first reference voltage level, if the use history satisfies the predetermined condition. In this embodiment of the present teachings, if the rechargeable batteries are discharged to at least the second reference voltage level and the use history satisfies the predetermined condition(s), the warning means will warn the operator that the rechargeable batteries should be recharged and/or the shut-off means will shut off the supply of current to the battery-operated device (e.g., power tool 20). Thus, if the use history meets the predetermined condition(s), the rechargeable batteries can be discharged more deeply than when the use history does not meet the predetermined condition(s). As a result, battery pack 60 can be discharged substantially as deeply as when a refresh function is performed. Thus, this embodiment is also capable of providing all the advantages discussed further above.

Third Detailed Representative Embodiment

Figure 10:
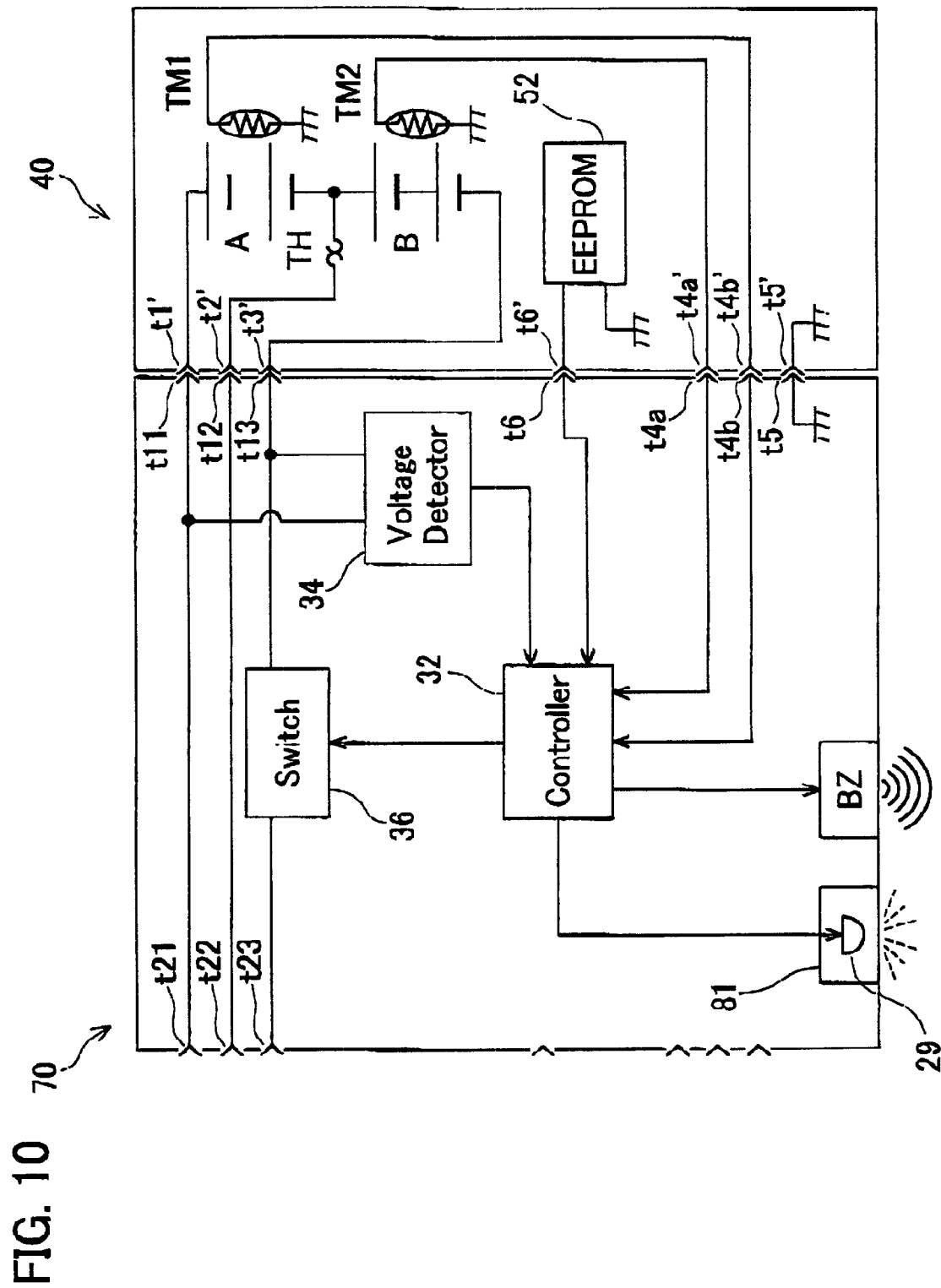
FIG. 10 is a schematic diagram of a representative electric circuit according to a third representative embodiment of the present teachings.
Figure 11:
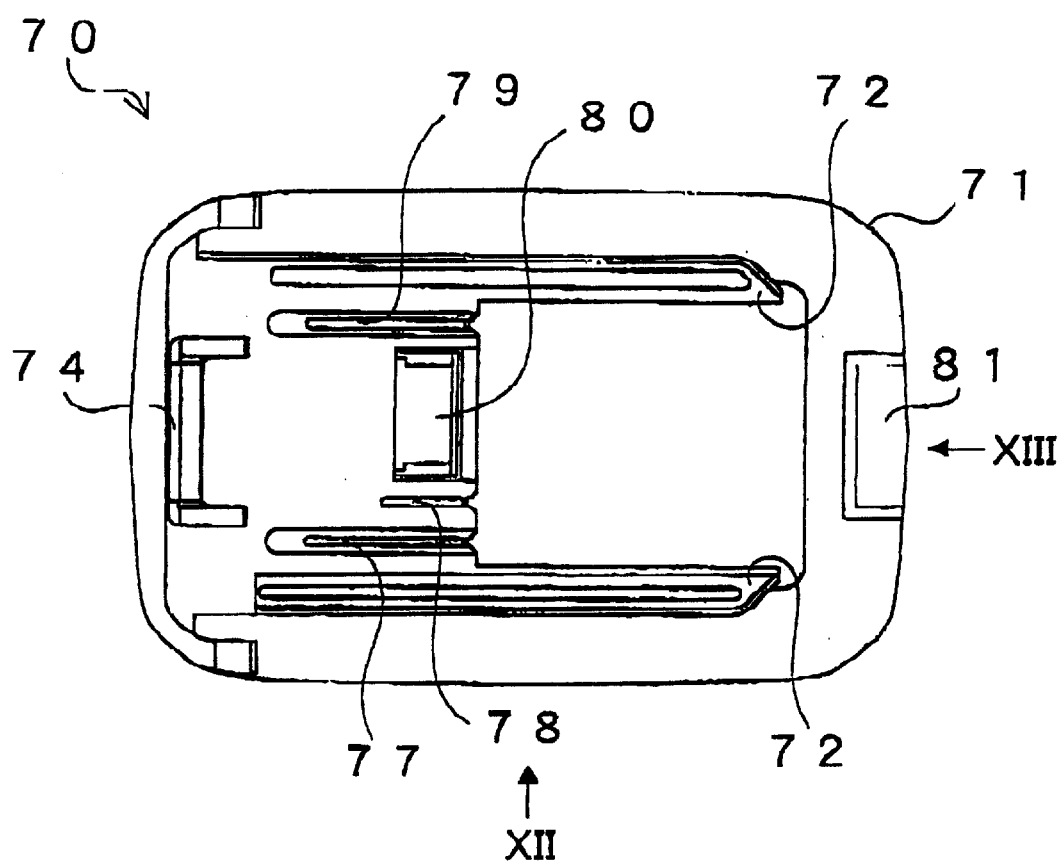
FIG. 11 is a plan view showing a representative adapter according to the present teachings.
Figure 12:
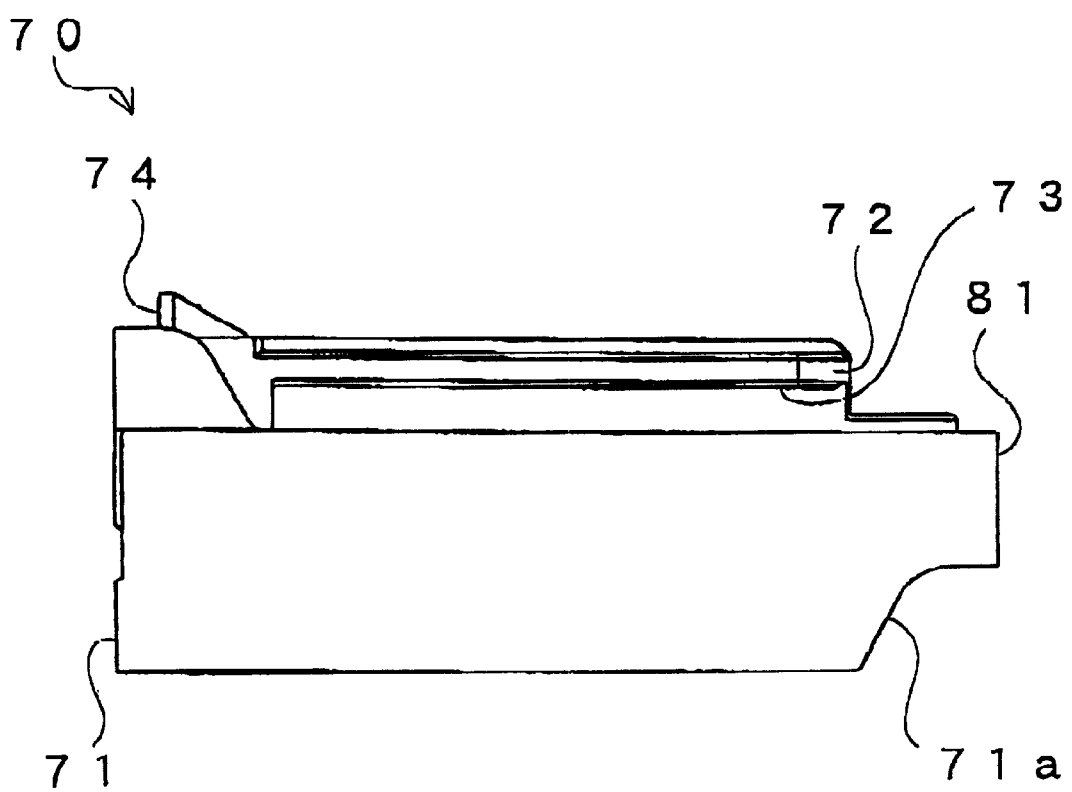
FIG. 12 is a side view of the adapter of FIG. 11 as viewed from the direction of arrow XII in FIG. 11.
Figure 13:
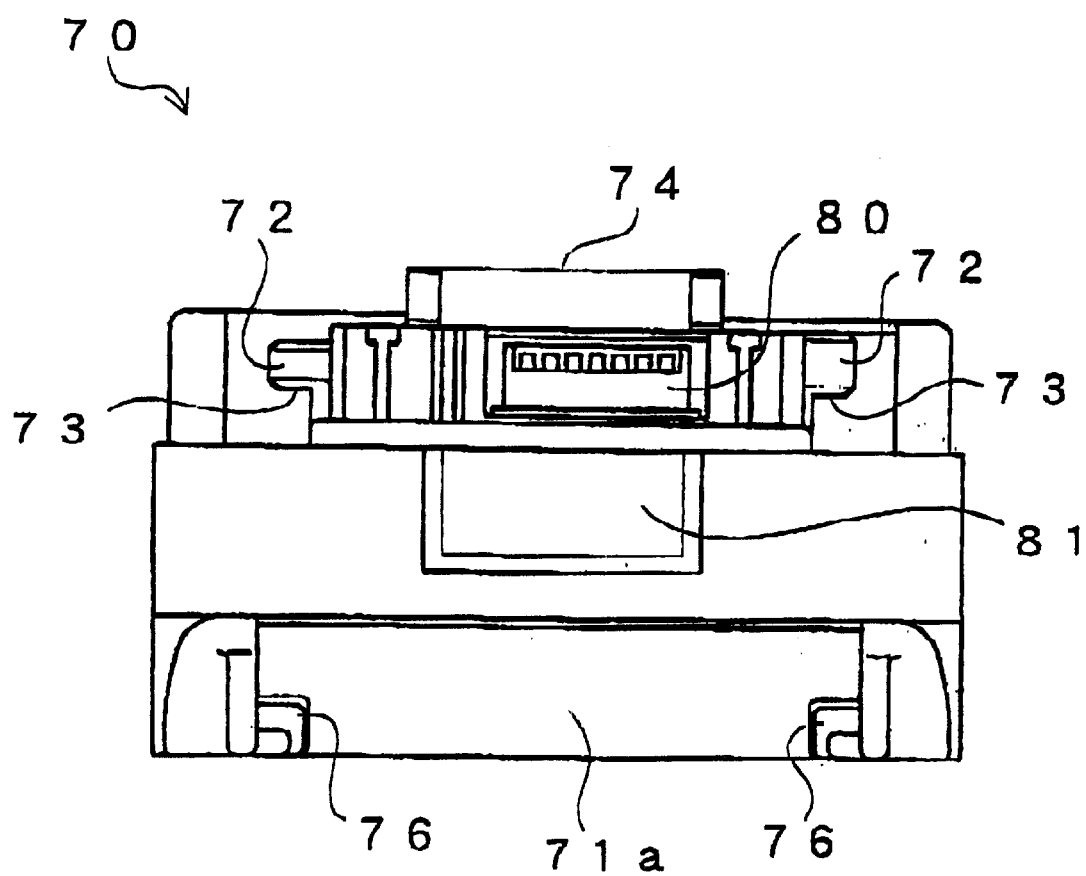
FIG. 13 is a side view of the adapter of FIG. 11 as viewed from the direction of arrow XIII in FIG. 11.
Figure 14:
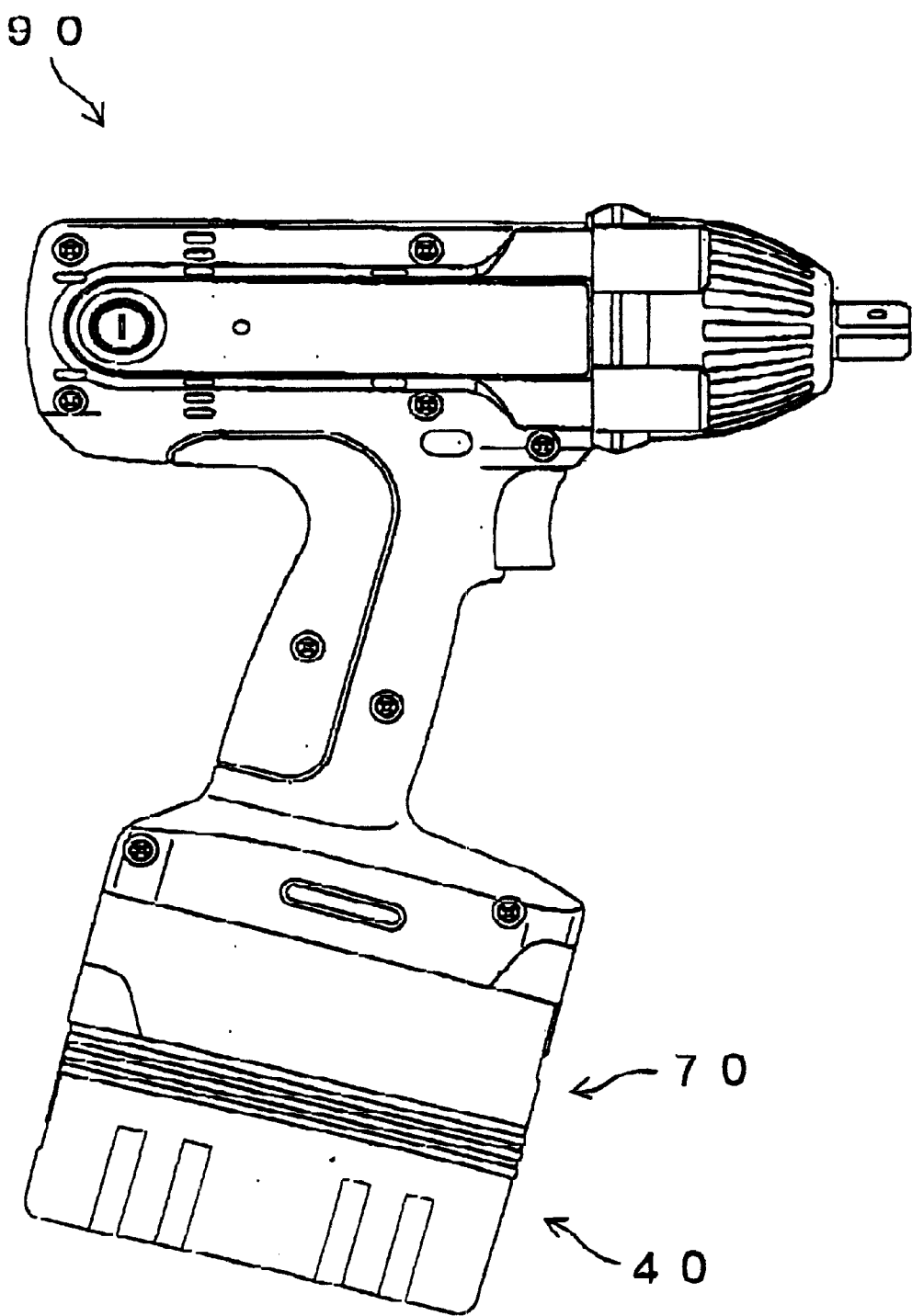
FIG. 14 shows a battery pack attached to a power tool via the adapter of FIGS. 11–13.

A third representative embodiment of the present teachings will be explained with reference to FIGS. 10 to 14. FIG. 10 is a block diagram showing a representative electric circuit that may be utilized with adapter 70. As shown in FIG. 10 adapter 70 may be interposed between battery pack 40 and a power tool (not shown). FIG. 11 is a plan view showing a representative exterior for adapter 70. FIGS. 12 and 13 are side views showing the representative exterior for adapter 70. FIG. 14 shows battery pack 40 attached to power tool 90 via adapter 70.

Referring first to FIG. 14, adapter 70 may be utilized to connect power tool 90 to battery pack 40. In this embodiment neither power tool 90 or battery pack 40 is required to include the warning function in order advise the operator when it is time to recharge battery pack 40. Instead, adapter 70 may provide this function. Therefore, adapter 70 may include controller 32, voltage detector 34, switch 36, buzzer BZ, and/or LED 29. In the first representative embodiment, these elements were included within power tool 20 and in the second representative embodiment, these elements were included within battery pack 60. Thus, the particular location of these elements is not particularly limited according to the present teachings. Further, because substantially the same elements may be utilized in the third representative embodiment, the same reference numerals will be used and further explanation of the same similar parts may be omitted.

Moreover, adapter 70 may utilize any of the representative control programs that were described above with reference to FIGS. 4–6, winch representative control programs are incorporated into the third representative embodiment by reference. Therefore, further explanation of representative control program for use with the third representative embodiment is not necessary.

As shown in FIGS. 10 to 13, adapter 70 may include casing 71 made of a hard resin or plastic material. The shape of casing 71 may be approximately rectangular columnar, although the shape of casing 71 may be appropriately selected in order to conform to the shape of the corresponding battery-powered device (e.g., power tool 20) and the corresponding battery pack 40. Casing 71 may include controller 32, voltage detector 34, switch 36, light emitter 81, LED 29, buzzer BZ, as well as other related parts.

Similar to battery park 20, adapter 70 may include fitting portions 72, which may be defined on the upper surface of casing 71 in the form of a pair of parallel rails. Fitting portions 71 may each include fitting groove 73 that is arranged and constructed to engage power tool 90. In addition, hook 74 may be disposed on the upper surface of casing 71, e.g., near one end of fitting portions 72. Preferably, hook 74 can vertically project or retract. Further, positive terminal groove 77, center terminal groove 78, negative terminal groove 79, connector go and other parts may be provided on adapter 70.

Further, holder section 71a may be defined on the lower surface of casing 71 in order to enable battery pack 40 to be releasably attached to adapter 70. Holder section 71a may include fitting portions 76 that are disposed in the form of a pair of parallel rails so as to engage battery pack 40. For example, Fitting portions 76 may enable power tool 90 to slidingly engage with holder section 71a. Holder section 71a may also include connection terminals t11, t12, t13 that are receptively connected to positive terminal t1', center terminal t2', negative terminal t3', of battery pack 40

Hook 74 may be integrally molded with a level (not shown), which lever was described in further detail in the first representative embodiment. The lever may, e.g., be disposed on a side of casing 71. Hook 74 may be urged in a projecting direction by a coil spring (not shown). When adapter 70 is mounted on power tool 90, hook 74 can engage a corresponding hook groove, which is formed in power tool 90. Therefore, adapter 70 is prevented from being easily detached from power tool 90. On the other hand, by pushing down the lever towards the lower end of casing 71 against the urging force of the coil spring, hook 74 will retract. Consequently, hook 74 will disengage from the hook groove disengage, thereby enabling adapter 70 to be detached from power tool 90.

Positive terminal groove 77, center terminal groove 78, and negative terminal groove 99 may respectively include positive terminal t21, center terminal t22 and negative terminal t23. Each of these elements may he soldered to a printed circuit board that is incorporated within casing 71. When adapter 70 is attached to power tool 90, the terminals t21, t22, and t23 can contact the corresponding terminals of power tool 90. Positive terminal t21 and negative terminal t23 may be respectively electrically connected to positive electrode t11 and negative electrode t13 of holder section 71a. Center terminal t22 may be electrically connected to center electrode t12 of holder section 71a. Thus, current from battery pack 40 can be supplied to power tool 90 via adapter 70.

Connector 80 may be exposed on the upper surface of casing 71 and may be soldered to the printed circuit board that is disposed with casing 71. However, if information is not sent from battery pack 40 to power tool 90, connector 80 is not required to be utilized.

Light emitter 81 optionally may be disposed with a window made of a tinted or colorless transparent resin. Further, light emitter 81 may be disposed on a side of the upper surface of casing 71. Light emitter 81 may include LED 29, which is shown in FIG. 10. When controller 32 determines battery pack 40 should be recharged based upon the executed control program, LED 29 may be illuminated in order to warn the operator of power tool 90.

In addition or in the alternative, buzzer BZ optionally may be disposed within casing 71 of adapter 70. Buzzer BZ may be coupled to controller 32 via a driver circuit (not shown) in the same manner as LED 29. Buzzer BZ may be utilized in the same manner as was described in the first and second representative embodiments. Therefore, further description of the use of buzzer BZ is not necessary.

Because adapter 70 includes controller 32, light emitter 81, buzzer BZ and switch 36, adapter 70 can perform the same warning and current shut off functions as power tool 20 (first representative embodiment) and battery pack 60 (second representative embodiment). Thus, because these functions and representative circuits for performing these functions have been described in detail above, it is not necessary to repeat the detailed operation of adapter 70 herein. Instead, the descriptions concerning the warning and current shut off functions, as well as the representative control programs shown in FIGS. 4–6, are incorporated into the third representative embodiment by reference.

Adapter 70 optionally may include switch 36, which together with controller 32 can shut off the supply of current to power tool 90 when battery pack 40 has been discharged to the set (selected) reference voltage level EV (or EV. $\Delta$V). However, switch 36 may naturally be included within power tool 70. But, by including controller 32, switch 36 and one or more of light emitter 81 and buzzer BZ, adapter 70 can be utilized with power tools and battery packs that do not have such features. Thus, adapter 70 may be advantageously utilized to add the above-described warning, current shut off and discharge functions to known power tools and known battery packs.

Thus, the third representative embodiment may provide adapters that are arranged and constructed to be mounted between a battery-powered device and a rechargeable battery pack. Further, the adapters optionally may include means (e.g., a light or buzzer) for warning the operator that the rechargeable batteries should be recharged. For example, the warning means may inform the operator when the rechargeable batteries have been discharged to a predetermined reference voltage level. In addition, the adapters optionally may include means (e.g., a processor and a switch) for automatically shutting off the supply of current to motor M when the rechargeable batteries have been discharged to a predetermined reference voltage level. Furthermore, the adapters may include means (e.g., a processor or other controller) for changing the reference voltage level to which the rechargeable batteries will be discharged before the warning is provided. For example, the reference voltage level changing means may change the reference voltage level in accordance with the use history of the rechargeable batteries, as was discussed in greater detail above.

Thus, in such adapters, when the rechargeable batteries have been discharged to the predetermined reference voltage level, the warning means may optionally warn the operator that the rechargeable batteries should be recharged. The reference voltage level can be changed according to the teachings provided above, e.g., in accordance with the use history of the rechargeable batteries. The time that the warning is provided can be changed in a manner that will prevent over-discharging the rechargeable batteries, prevent memory effects and prolong the usable life of the rechargeable batteries.

Further, when the rechargeable batteries have been discharged to the predetermined reference voltage level, the adapter may automatically shut off the supply of current to the battery-operated device. The reference voltage level(s) may be the same reference voltage level(s) that were used to warn the operator. In the alternative, if the warning means is provided with such adapters, the reference voltage level(s) for automatically shutting off current may be lower (e.g., EV. $\Delta$V) than the reference voltage level(s) utilized to warn the operator. The reference voltage level changing means may operate substantially in the same manner as described above (e.g., the use history of the rechargeable batteries may be considered in order to set the appropriate reference voltage level EV).

In any of the above-described adapters, the reference voltage level may be set to a first reference voltage level if the use history does not satisfy a predetermined condition. On the other hand, the reference voltage level may be set to at least a second reference voltage level, which is greater than the first reference voltage level, if the use history satisfies the predetermined condition. In the embodiment of the present teachings, if the rechargeable batteries are discharged o at least the second reference voltage level and the use history satisfies predetermined condition(s), the warning means will warn the operator that the rechargeable batteries should be recharged and/or the shut-off means will shut off the supply of current to the battery-operated device (e.g., power tool 20). Thus, if the use history meets the predetermined condition(s), the rechargeable batteries can be discharged more deeply than when the use history does not meet the predetermined condition(s). As a result, the rechargeable batteries can be discharged substantially as deeply as when a refresh function is performed. Thus, this embodiment also is capable of providing all the advantages discussed further above.

The present battery usage and charging techniques can be utilized with a variety of battery powered devices, and the present teachings are not limited to only power tools. Further, the warning means are not limited to buzzer BZ and light emitter 27, 61, 81. Various types of audio warnings may be provided, e.g., via a speaker or other sound producing devices. Furthermore, various types of visual warnings may be provided, e.g., via a liquid crystal display or other image producing devices.

Naturally, the present teachings are not limited to any particular battery charging technique or battery pack design and a variety of battery charging techniques known in the art may be utilized with the present teachings. For example, the battery charging techniques and battery pack designs shown in U.S. Pat. Nos. 6,075,347, 6,124,698, 6,191,554, 6,191,560, 6,204,640, 6,204,641, 6,225,786, 6,229,280, 6,275,009, 6,278,261, 6,346,793 and 6,362,600, European Patent Publication No. 0 994 523 and Japanese Patent Publication No. 2001-143768 (the corresponding U.S. patent applications being incorporated herein by reference) may be utilized with the present teachings. These patents and published patent applications disclose battery charging techniques that, generally speaking, involve detecting the battery temperature of rechargeable batteries using a temperature sensor and increasing or decreasing the charging current based upon the detected battery temperatures. In addition, these battery pack designs generally include shielding the battery cells from the forced air that flows through tho battery pack in order to cool the battery cells during recharging. Moreover, other charging techniques may be utilized with the present teachings, such as the charging techniques described for example in U.S. Pat. Nos. 5,550,453, 5,627,451, 5,945,803 and 6,008,628 and European Patent Publication No. 966089. A person of skill in the art will immediately recognize the advantages of combining the present teachings with one or more of the teachings of the above-mentioned patents and patent applications and all of these patents and patent applications are hereby incorporated by reference as if fully disclosed herein.

What is claimed is:

1. An apparatus comprising:
   a voltage detector arranged and constructed to detect the voltage level of at least one rechargeable battery, and
   a controller arranged and constructed to (a) select a reference voltage level from a plurality of reference voltage levels stored in memory based upon use history of the rechargeable batteries stored in memory, (b) compare the detected battery voltage level to the selected reference voltage level, and (c) indicate that the at least one rechargeable battery is due for recharging when the detected battery voltage level becomes equal to or less than the selected reference voltage level.

2. An apparatus as in claim 1, wherein the controller is further arranged and constructed to select a first reference voltage level when the use history does not satisfy a predetermined condition and to select a second reference voltage level when the use history satisfies the predetermined condition, and wherein the second reference voltage level is lower than the first reference voltage level.

3. An apparatus as in claim 2, further comprising at least one means for warning an operator that the rechargeable batteries are due for recharging when the detected battery voltage becomes equal to or less than the selected reference voltage level.

4. An apparatus as in claim 3, further comprising means for shutting off electric current supplied by the rechargeable batteries to a load when the detected battery voltage becomes equal to or less than (a) the selected reference voltage level or (b) the selected reference voltage level minus a small voltage (EV. ΔV).

5. An apparatus as in claim 1, further comprising means for shutting off electric current supplied by the rechargeable batteries to a load when the detected battery voltage becomes equal to or less than (a) the selected reference voltage level or (b) the selected reference voltage level minus a small voltage (EV. ΔV).

6. An apparatus as in claim 1, further comprising:
   at least one means for warning an operator that the rechargeable batteries are due for recharging when the detected voltage of the rechargeable batteries becomes equal to or less than the selected reference voltage level, and
   means for shutting off electric current supplied by the recharagble batteries to a load when the detected voltage of the rechargeable batteries becomes equal to or less than the selected reference voltage level minus a small voltage (EV. ΔV), wherein the warning means first warns the operator when the detected voltage of the rechargeable batteries falls below the selected reference voltage and, if the operator does not discontinue use of the rechargeable batteries before the detected voltage of the rechargeable batteries falls below the selected reference voltage level minus a small voltage (EV. ΔV), the shutting off means automatically stops the supply of electric current from the rechargeable batteries to the load.

7. An apparatus as in claim 5, further comprising the at least one rechargeable battery, wherein the load comprises a power tool motor driven by the rechargeable batteries.

8. An apparatus as in claim 1, further comprising the at least one rechargeable battery and a power tool motor driven by the rechargeable batteries.

9. A method for determining an appropriate timing for recharging at least one rechargeable battery, comprising:
   selecting a reference voltage level from a plurality of reference voltage levels based upon use history of the at least one rechargeable battery, wherein the use history and the plurality of reference voltage levels are stored in a semiconductor memory,
   detecting the voltage level of the at least one, rechargeable battery,
   comparing the detected battery voltage level to the selected reference voltage level, and
   indicating to an operator that the at least one rechargeable battery is due for recharging when the detected battery voltage level becomes equal to or less than the selected reference voltage level.

10. A method as in claim 9, further comprising shutting off electric current supplied by the rechargeable batteries when the detected battery voltage becomes equal to or less than the selected reference voltage level minus a small voltage (EV. ΔV).

11. A method as in claim 10, further comprising supplying current from the at least one rechargeable battery to a motor of a power tool while detecting the voltage level of the at least one rechargeable battery.

12. A method as in claim 9, further comprising supplying current from the at least one rechargeable battery to a motor of a power tool which detecting the voltage level of the at least one rechargeable battery.

13. An apparatus for determining an appropriate timing for recharging at least one rechargeable battery, comprising:
   means for detecting the voltage level of the at least one rechargeable battery,
   means for storing a plurality of reference voltage levels and for storing use history of the at least one rechargeable battery,
   means for selecting a reference voltage level from the plurality of stored reference voltage levels based upon the stored use history for the at least one rechargeable battery,
   means for comparing the detected battery voltage level to the selected reference voltage level, and
   means for indicating to an operator that the at least one rechargeable battery is due for recharging when the detected battery voltage level becomes equal to or less than the selected reference voltage level.

14. An apparatus as in claim 13, further comprising means for shutting off electric current supplied by the rechargeable batteries when the detected battery voltage becomes equal to or less than the selected reference voltage level minus a small voltage (EV.ΔV).

15. An apparatus as in claim 14, further comprising means for supplying current from the at least one rechargeable battery to a motor of power tool while detecting the voltage level of the at least one rechargeable battery.

16. An apparatus as in claim 13, further comprising means for supplying current from the at least one rechargeable battery to a motor of a power tool while detecting the voltage level of the at least one rechargeable battery.

17. An apparatus as in claim 13, wherein the indicating means comprise a light.

18. An apparatus as in claim 13, wherein the indicating means comprises a buzzer.

19. An apparatus as in claim 13, further comprising the at least one rechargeable battery, wherein the load comprises a power tool motor driven by the rechargeable batteries.

20. An apparatus as in claim 13, further comprising means for releasably attaching to a battery pack comprising the at least one rechargeable battery and means for releasably attaching to a power tool comprising a motor driven by the at least one rechargeable battery.

21. An apparatus as in claim 1, further comprising means for releasably attaching to a battery pack comprising the at least one rechargeable battery and means for releasably attaching to a power tool comprising a motor driven by the at least one rechargeable battery.

* * * * *